United States Patent
Wu et al.

(10) Patent No.: US 9,606,257 B2
(45) Date of Patent: Mar. 28, 2017

(54) REAL-TIME FRACTURE DETECTION AND FRACTURE ORIENTATION ESTIMATION USING TRI-AXIAL INDUCTION MEASUREMENTS

(75) Inventors: Peter T. Wu, Missouri City, TX (US); Dong Weixin, Sugar Land, TX (US); Thomas D. Barber, Houston, TX (US); Dean Homan, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 540 days.

(21) Appl. No.: 13/217,983

(22) Filed: Aug. 25, 2011

(65) Prior Publication Data

US 2012/0065889 A1     Mar. 15, 2012

Related U.S. Application Data

(60) Provisional application No. 61/383,125, filed on Sep. 15, 2010.

(51) Int. Cl.
    *G01V 1/40*         (2006.01)
    *G01V 3/28*         (2006.01)

(52) U.S. Cl.
    CPC ..................... *G01V 3/28* (2013.01)

(58) Field of Classification Search
    CPC .............. G01V 3/28; G01V 2210/646; G01V 2210/1234
    USPC .......................................................... 702/11
    See application file for complete search history.

(56) References Cited

U.S. PATENT DOCUMENTS

| 5,781,436 | A | 7/1998 | Forgang et al. |
| 5,899,958 | A * | 5/1999 | Dowell et al. ............... 702/6 |
| 6,798,208 | B2 | 9/2004 | Omeragic |
| 6,924,646 | B2 | 8/2005 | Omeragic |

(Continued)

FOREIGN PATENT DOCUMENTS

| WO | 2009070384 A1 | 6/2009 |
| WO | 2013036509 A1 | 3/2013 |

OTHER PUBLICATIONS

International Search Report and Written Opinion of PCT Application No. PCT/US11/51747 dated Feb. 28, 2012.

(Continued)

*Primary Examiner* — John Breene
*Assistant Examiner* — Stephanie Bloss
(74) *Attorney, Agent, or Firm* — Michael Dae

(57) ABSTRACT

A method for determining existence of a fracture in a formation surrounding a wellbore drilled through subsurface rock formations includes calculating vertical resistivity, horizontal resistivity, apparent formation dip, apparent formation azimuth and axial resistivity for a plurality of longitudinal instrument spacings using measurements from a triaxial induction well logging instrument disposed in the formation. A spread in the axial resistivity values is determined and the axial resistivity spread threshold therefrom. Fracture indicator values and fracture orientation values are calculated from transverse components of the triaxial induction measurements. Presence of a fracture is indicated when at least one of the fracture indicator value exceeds a selected threshold, the axial resistivity spread exceeds the spread threshold and when the apparent formation dip exceeds a selected threshold.

8 Claims, 18 Drawing Sheets

(56) References Cited

U.S. PATENT DOCUMENTS

| | | |
|---|---|---|
| 6,937,021 B2 | 8/2005 | Rosthal |
| 7,359,800 B2 | 4/2008 | Rabinovich et al. |
| 2004/0001388 A1* | 1/2004 | Kriegshauser et al. ........ 367/21 |
| 2005/0256645 A1* | 11/2005 | Rabinovich et al. ............. 702/7 |
| 2007/0083331 A1* | 4/2007 | Craig .............................. 702/13 |
| 2008/0030196 A1* | 2/2008 | Bespalov et al. ............. 324/339 |
| 2009/0292472 A1* | 11/2009 | Montaron ......................... 702/8 |
| 2010/0161228 A1 | 6/2010 | Heliot et al. |
| 2010/0198569 A1 | 8/2010 | Wu et al. |
| 2010/0230095 A1* | 9/2010 | Yin ........................... 166/250.1 |

OTHER PUBLICATIONS

Office Action issued in related MX application MX/a/2013/002599 on Jul. 19, 2015, 5 pages.

\* cited by examiner

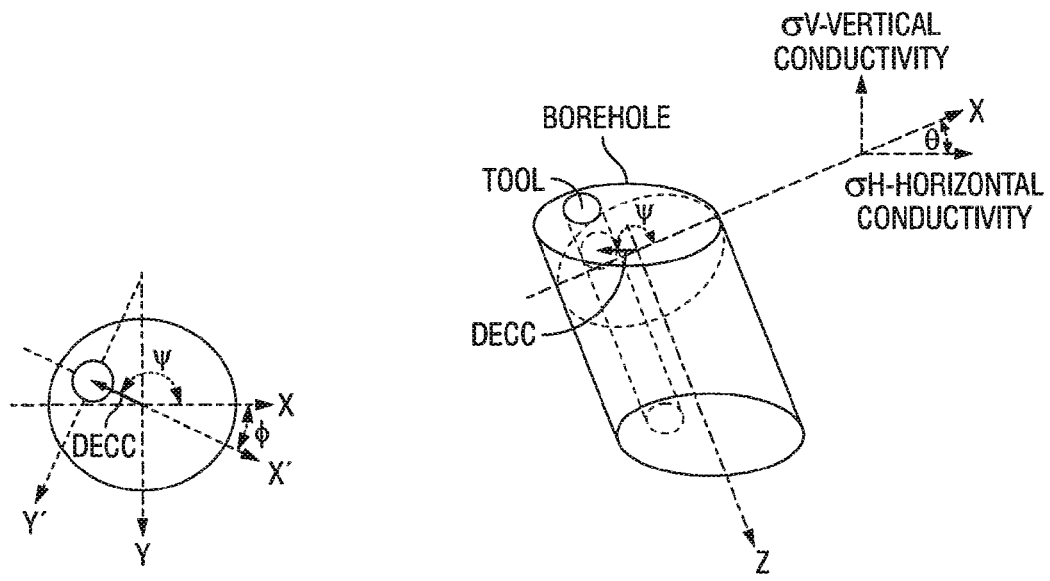
FIG. 2A
(Prior Art)
FIG. 2B
(Prior Art)
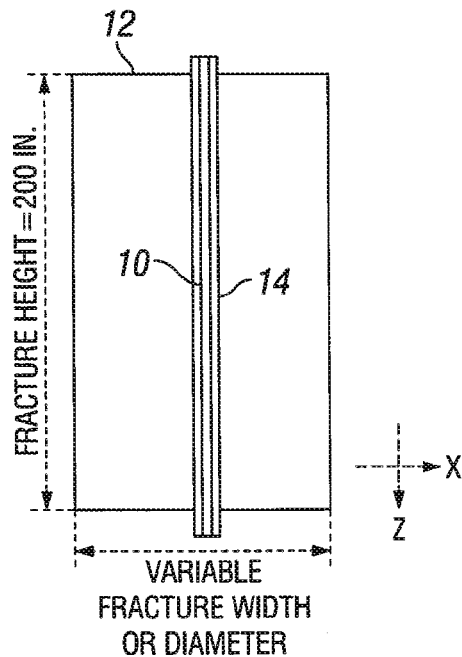
FIG. 3

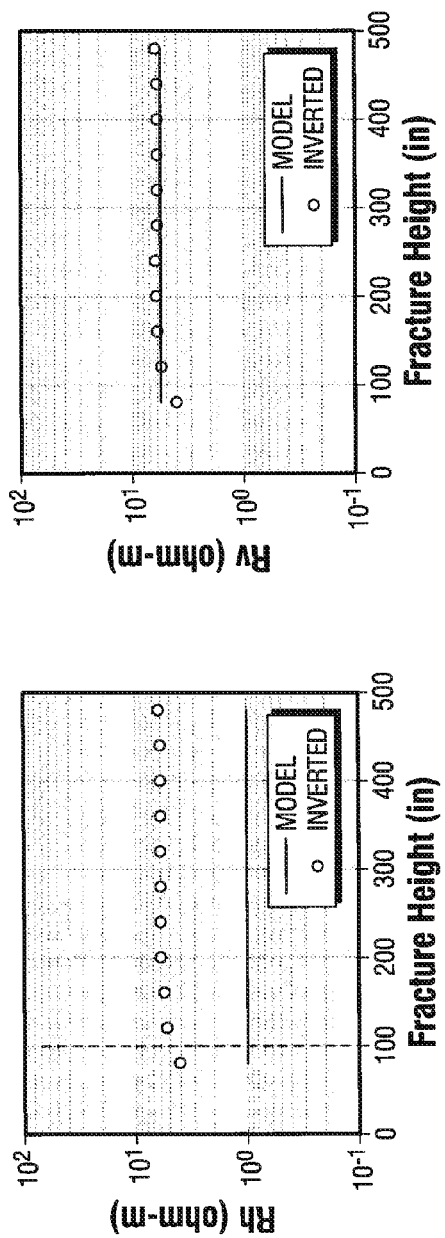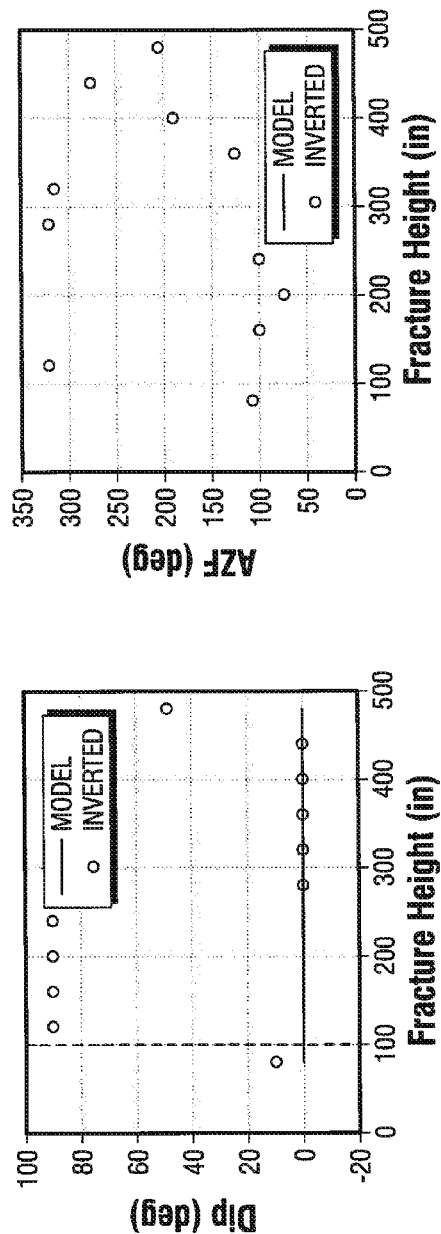

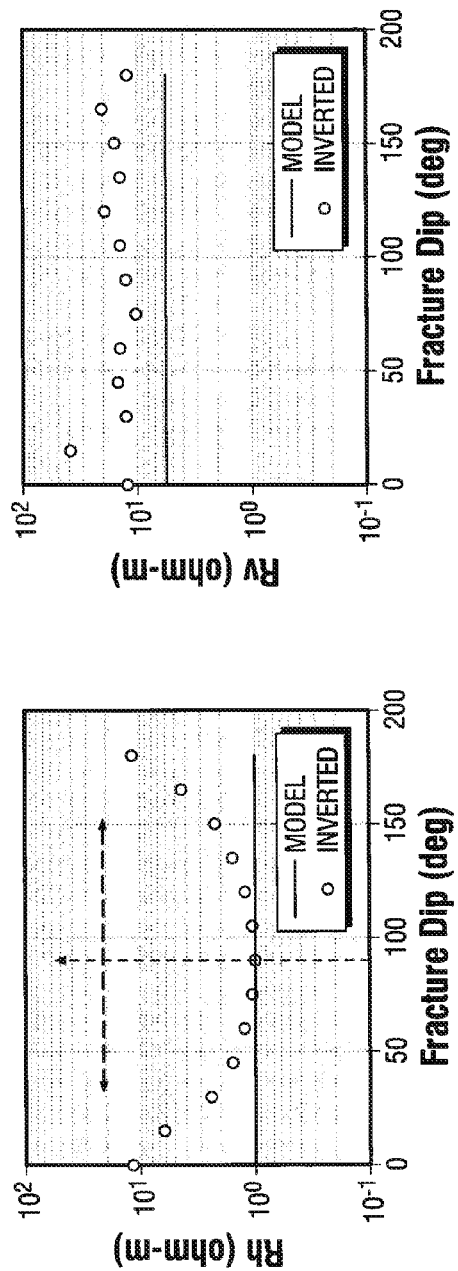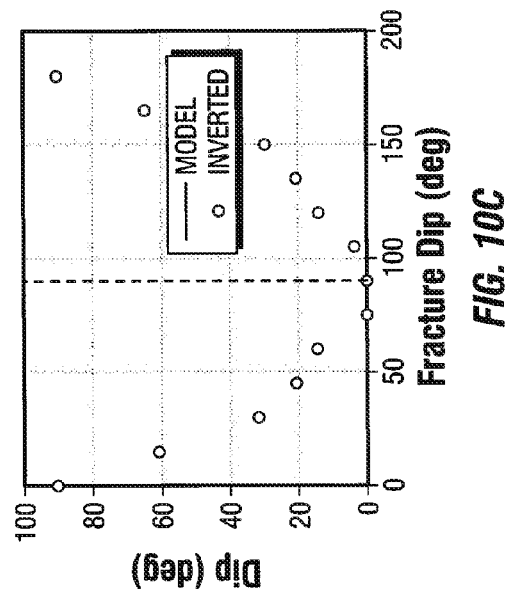
FIG. 10A
FIG. 10B
FIG. 10C
FIG. 10D

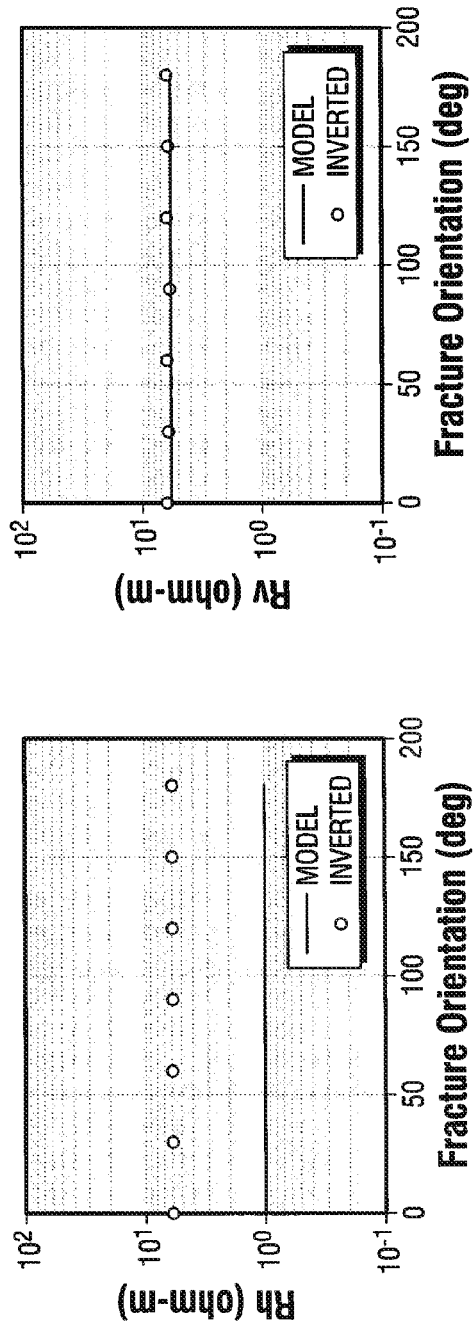
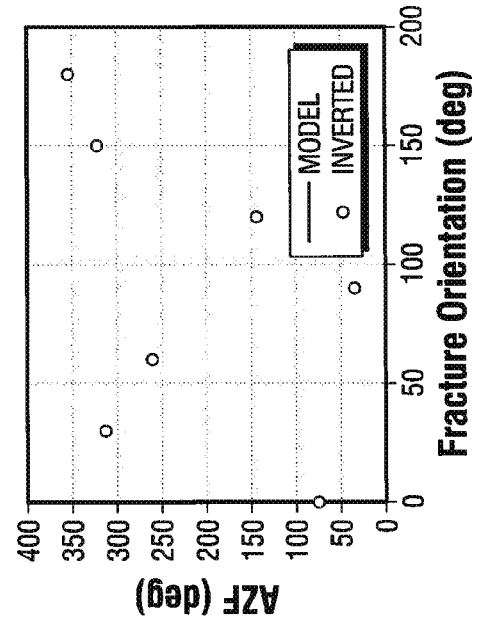
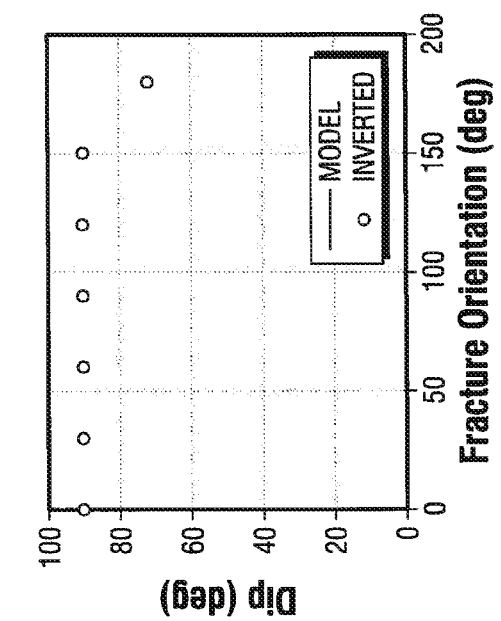
FIG. 15A  FIG. 15B  FIG. 15C  FIG. 15D

REAL-TIME FRACTURE DETECTION AND FRACTURE ORIENTATION ESTIMATION USING TRI-AXIAL INDUCTION MEASUREMENTS

CROSS REFERENCE TO RELATED APPLICATIONS

Priority is claimed from U.S. Provisional Application No. 61/383,125 filed on Sep. 15, 2010, incorporated herein by reference in its entirety.

STATEMENT REGARDING FEDERALLY SPONSORED RESEARCH OR DEVELOPMENT

Not Applicable

BACKGROUND OF THE INVENTION

Field of the Invention

The invention relates generally to the field of multiaxial electromagnetic induction well logging instruments and methods. More specifically, the invention relates to using measurements from multiaxial electromagnetic induction well logging instruments to determine the existence and geodetic orientation of fractures in subsurface rock formations.

Background Art

Electromagnetic (EM) based instruments for measuring properties of matter or identifying its composition, for example that of rock formations penetrated by a wellbore, are well known. The values of electrical properties for earth formations have been obtained through the use of electromagnetic induction instruments for over 50 years. EM propagation well logging devices are also well known, and are used for measuring basic parameters such as amplitude and phase shift of EM waves being propagated through a medium (e.g., subsurface rock formations) in order to determine specific properties of the medium (e.g., conductivity and dielectric constant).

Electrical conductivity (or its inverse, resistivity) is an important property of subsurface rock formations used in geological surveys and prospecting for oil, gas, and water because many minerals, and more particularly hydrocarbons, are less conductive than common porous sedimentary rocks that are typically saturated with water. Thus, a measure of the conductivity is often a guide to the presence and amount of oil, gas, or water in a particular formation. Induction logging methods are based on the principle that time varying electric currents passed through a wire coil or loop, due to the corresponding time varying magnetic flux induced, induce electric currents in rock formations in relation to the electrical conductivity of such formations.

EM propagation well logging instruments generally use multiple longitudinally-spaced transmitter antennas operating at one or more frequencies and a plurality of longitudinally spaced receivers or pairs thereof. An EM wave is propagated from the transmitter antenna into the formation in the vicinity of the wellbore in which the instrument is disposed. The EM wave is detected at the receiver antenna(s). A plurality of parameters of interest can be determined by combining the basic measurements of phase and amplitude of the wave as it is detected with reference to the transmitted EM wave. Such parameters include the resistivity, dielectric constant and porosity (fractional volume of pore space) of the formation as well as, for example, the extent to which the fluid within the borehole migrates into the earth formation.

The transmitter antennas on induction well logging instruments generate a time-varying magnetic field when a time-varying electric current is applied to them. The time-varying magnetic field induces eddy currents in the surrounding earth formations. The eddy currents induce voltage signals in the receiver antennas, which are then measured. The magnitude of the in phase and quadrature components of the induced voltage signals varies in accordance with the formation properties such as those described above. The formation properties can thus be determined from measurements of the components of the induced voltage signals.

Conventional (uniaxial) induction well logging antennas consist of wire coils or solenoids mounted on the instruments with their longitudinal axes (and thus their magnetic dipole moments) parallel to the instrument's central or longitudinal axis. Therefore, the magnetic field induced by passing electric current through such a transmitter coil is also parallel to the central axis of the instrument (which is substantially parallel to the axis of the wellbore). The corresponding induced eddy currents typically flow in loops lying in planes perpendicular to the instrument axis (and thus the wellbore axis).

The response of the described induction logging instruments, when analyzing thinly stratified earth formations, strongly depends on the conductivity of formation layers (strata) oriented parallel to the flow of the eddy currents. Nonconductive layers interleaved within the conductive layers will not contribute substantially to the measured response of the instrument and therefore their contributions to the measured signals will be substantially masked by the conductive layers' response. Accordingly, the nonconductive layers are not detected by typical uniaxial induction well logging instruments when the thicknesses of the interleaved conductive and non-conductive layers are substantially smaller than the axial resolution of the instrument (generally related to the longitudinal spacing between the transmitter and receiver antennas).

Many earth formations consist of conductive layers with non-conductive layers interleaved between them as described above, wherein the layer thicknesses are substantially smaller than the axial resolution of the instrument. The non-conductive layers may be, for example, hydrocarbons disposed in the pore spaces of a porous, permeable rock formation layer. Thus conventional induction well logging instruments are of limited use for the analysis of thinly stratified formations.

Solutions have been proposed to detect nonconductive layers located within conductive layers in thinly stratified rock formations. For example, U.S. Pat. No. 5,781,436 describes a method that consists of selectively passing an alternating current through a plurality of EM induction transmitter coils inserted into the well with at least one coil having its longitudinal axis oriented differently from the axis orientation of the other transmitter coils.

The coil arrangement shown in U.S. Pat. No. 5,781,436, incorporated herein by reference, consists of several transmitter and receiver coils with their centers distributed at different locations along the instrument and with their axes in different orientations. Several coils have the orientation of conventional single axis induction logging instruments, i.e., with their axes parallel to the instrument axis, and therefore to the well axis. Other coils have their axes perpendicular to the instrument axis. This latter arrangement of transmitter or receiver coil is usually referred to as a transverse coil.

Thus transverse EM logging techniques use antennas whose magnetic moment is transverse to the well's longitudinal axis. The magnetic moment m of a coil or solenoid-type antenna is represented as a vector quantity oriented parallel to the induced magnetic field, with its magnitude proportional to the corresponding magnetic flux. To a first approximation, a coil with a magnetic moment m can be analyzed as a dipole antenna due to the induced magnetic poles.

In some applications it is desirable for a plurality of differently directed magnetic moments to have a common intersection point. For example, dipole antennas are known to be arranged such that their magnetic moments point along mutually orthogonal directions and have a common center point. An arrangement of a plurality of dipole antennas wherein the induced magnetic moments are oriented orthogonally in three different directions is referred to as a triaxial orthogonal set of magnetic dipole antennas. An example of such an antenna may consist of a solenoid antenna coaxial with the instrument axis and two substantially longitudinally collocated, perpendicularly arranged "saddle" coils. The result of such arrangement is a mutually orthogonal moment triaxial antenna with a common center of each transmitter's magnetic dipole.

A well logging instrument equipped with a plurality of multiaxial antennas such as the one described above offers advantages over an arrangement that uses single axis solenoid coils distributed at different axial positions along the instrument with their axes in different orientations. For example, a 3D triaxial induction tool, such as one known by the trademark RT SCANNER, which is a trademark of the assignee of the present invention, measures 9 separate component apparent conductivity tensors ($\sigma m(i,j,k)$, $j,k=1, 2, 3$) at each a plurality of axial spacings between respective multiaxial transmitters and multiaxial receivers. Each of the foregoing may be represented by an index i. FIG. 1 illustrates such a triaxial induction measurement system. The apparent conductivity measurements are usually obtained in the frequency domain by actuating the transmitters with a continuous wave (CW) of one or more selected frequencies to enhance the signal-to-noise ratio. However, measurements of the same information content could also be obtained and used from time domain signals, e.g., by passing a transient electric current through the transmitters, using a Fourier decomposition process. This is a well know physics principle of frequency-time duality. Transient current may include direct current that is switched on, switched off, reversed polarity, or may be switched in a sequence such as a pseudorandom binary sequence. The formation properties, such as horizontal and vertical conductivities ($\sigma h$, $\sigma v$), relative dip angle ($\theta$) and the dip azimuthal direction ($\Phi$), as well as wellbore and tool properties, such as wellbore fluid ("mud") conductivity ($\sigma mud$), wellbore diameter (hd), tool eccentering distance (decc), tool eccentering azimuthal angle ($\psi$), all affect the foregoing conductivity tensors. FIG. 2 illustrates an eccentered triaxial induction instrument disposed in a wellbore drilled through an anisotropic formation with a particular dip angle. Using a simplified model of layered anisotropic formation traversed obliquely by a wellbore, the response of the conductivity tensors depends on the above eight parameters ($\sigma h$, $\sigma v$, $\theta$, $\Phi$, $\sigma mud$, hd, decc, $\psi$) in a very complicated manner. The effects of the wellbore and tool to the measured conductivity tensors may be very large even in oil based mud (OBM) environments, that is, even when the wellbore fluid conductivity is very low. Through an inversion technique sold under the trade name RADAR, which is a mark of the assignee of the present invention, the above wellbore/formation parameters can be calculated and the borehole effects can be removed from the measured conductivity tensor. The RADAR process is an inversion routine used for triaxial induction data obtained from the RT SCANNER instrument to perform the following functions: (1) borehole correction for measurements obtained in oil based mud (substantially non-conductive wellbore fluid); and (2) obtain Rh, Rv, dip ($\theta$), azimuth ($\Phi$) of selected formation based on a uniform anisotropic formation model. The RADAR inversion process is offered as a service by the assignee of the present invention and its affiliates.

The formation parameters ($\sigma h$, $\sigma v$, $\theta$, $\Phi$) are usually displayed in real-time to help the user make various decisions related to the drilling and completion of the wellbore being examined. The resistivities (the inverse of conductivities $\sigma h$, $\sigma v$) of the rock formations are used to delineate low apparent resistivity laminated "pay" zones, i.e., conductive formation layers interleaved with hydrocarbon bearing, higher resistivity layers. The dip and azimuth ($\theta$, $\Phi$) are used to map the structure of the formation in a scale much finer than that provided by surface reflection seismic data.

One of the important items of information that would affect the drilling and completion decisions of the well is whether the well has traversed significant fracture zones. Fractures occur frequently in the formation due to tectonic forces occurring over geological time. Fractures could also be induced by the drilling operation. Large, deep (deep in the sense of extending a long lateral distance from the wellbore) fracture systems can sometime be the key factor that allows the production of oil and gas from pay zones that would otherwise be substantially non-productive. Large, deep fracture systems traversed by the borehole could also causes loss of wellbore fluid (drilling mud). Knowing the location of the fracture zones and the fracture plane orientations can significantly improve drilling and completion decisions.

Very thin fractures with large planar extent filled with electrically substantially non-conductive fluid (oil based mud) may block the induced current in the formation and could produce significant anomalies in the inverted formation parameters compared with those from the same formation without such fractures. The size of the anomalies may depend on the formation's vertical and horizontal resistivity (Rh, Rv, defined as the resistivities parallel to and perpendicular to the layering of the formation), the size of the fracture plane, and the relative dip and azimuth between the fracture plane and the layering structure of the formation. If the fracture plane is nearly parallel to the layering structure of the formation, the effects of the fracture on the triaxial induction measurements are small. On the other hand, if the fracture plane is close to or perpendicular to the layering structure of the formation the effect of the fracture may dominate the response of the triaxial instrument measurements. The most common fracture system encountered in typical wellbores is nearly horizontally layered formations with vertically oriented fractures. Therefore, triaxial induction logging tools can be used to detect and characterize most of the large vertical fracture systems encountered by a typical wellbore.

There are several patents, i.e., "System and method for locating a fracture in an earth formation", U.S. Pat. No. 6,798,208 B2; "System and method for locating a fracture in an earth formation", U.S. Pat. No. 6,924,646 B2; and "Method and apparatus for determining the presence and orientation of a fraction in an earth formation", U.S. Pat. No. 6,937,021 B2, on the subject of using induction measurements to estimate the fracture orientation, the disclosures of which are incorporated herein by reference. All these prior patents have the detection of the existence of fracture in their title and claims. However, none of the above patents specifically discloses how to detect the existence of fracture. All three of the foregoing patents demonstrate that if a large planar fracture is present near the wellbore, the fracture azimuth can be computed from certain measurement components perpendicular to the fracture plane. Such a computation is useless without the capability of identifying the existence of the fracture in the first place. The algorithms described in the foregoing patents would compute a value which may be due to dipping anisotropic formation, and may have nothing to do with the existence of orthogonally oriented fractures. From practical point of view, it is far more important and useful to have a fracture indicator first than to have a means to compute the fracture azimuth assuming a large fracture exists near the wellbore.

SUMMARY OF THE INVENTION

Herein will be disclosed a method using components of the conductivity tensor to derive a fracture indicator flag (FF) and the fracture plane orientation (FO) which is the strike (geodetic) direction of the fracture plane. The zone of high FF indicates the existence of large vertical fracture system. The threshold value above which FF is considered high is determined by model data. Over the high FF zone, a method of computing the fracture direction is derived. The FF can also be used for log quality control (LQC) purposes to warn the system user of possible large errors in formation parameter calculation (e.g., $\sigma h$, $\sigma v$, $\theta$, $\Phi$) due to the existence of the fracture.

A method according to one aspect of the invention for determining existence of a fracture in a formation surrounding a wellbore drilled through subsurface rock formations includes calculating vertical resistivity, horizontal resistivity, apparent formation dip, apparent formation azimuth, and axial resistivity which is the apparent resistivity derived from axial zz coils only, for a plurality of longitudinal instrument spacings using measurements from a triaxial induction well logging instrument disposed in the formation. The axial resistivity measurements can come from the axial part of the triaxial induction tool, from an external axial tool such as the AIT which is a trademark of the assignee of the present invention, or from axial logging while drilling (LWD) measurements, or axial measurements conveyed in any manner. A spread in the axial resistivity values is determined and an axial resistivity spread threshold therefrom. Fracture indicator values and fracture orientation values are calculated from transverse components of the triaxial induction measurements. Presence of a fracture is indicated when the fracture indicator value exceeds a selected threshold, the axial resistivity spread exceeds the spread threshold and when the apparent formation dip exceeds a selected threshold.

Other aspects and advantages of the invention will be apparent from the description and the claims which follow.

BRIEF DESCRIPTION OF THE DRAWINGS

FIG. 2 is an illustration of an eccentered tool in a borehole through an anisotropy formation at a relative dip angle.

FIG. 3 shows a planar fracture model with variable width.

FIGS. 7A through 7D show inverted formation parameters from fractured formation with variable height.

FIGS. 10A through 10D show inverted formation parameters from fractured formation with variable dip, the formation dip and azimuth are zero.

FIGS. 15A through 15D show inverted formation parameters from large vertical fractured formation with variable strike (orientation).

DETAILED DESCRIPTION

Figure 1:
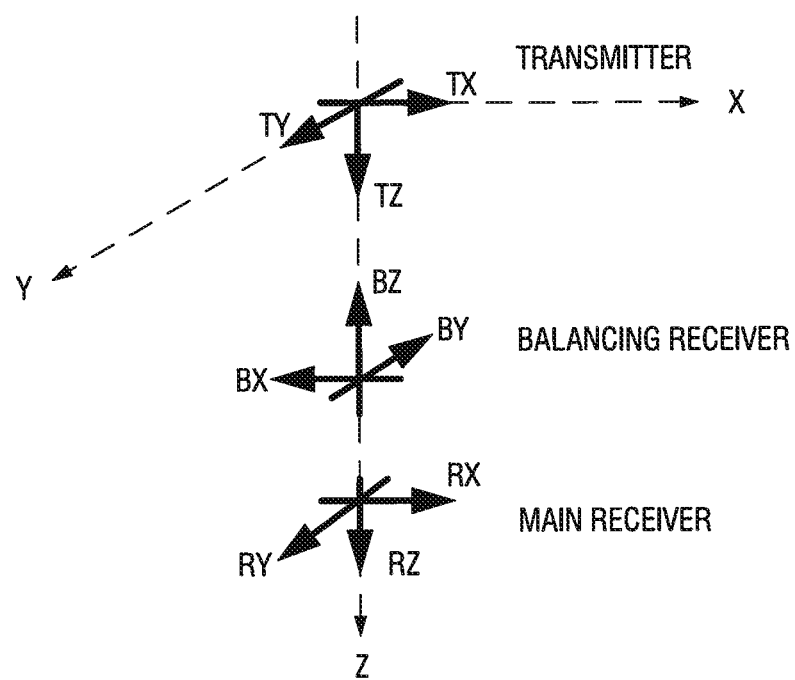
FIG. 1 is an illustration of triaxial induction array measurements at a given spacing.
Figure 4A:
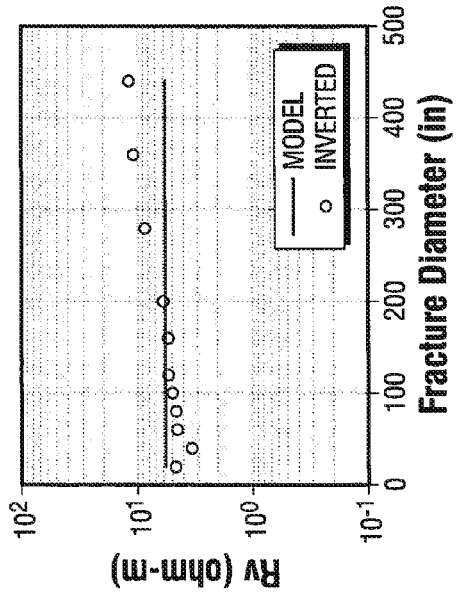
FIGS. 4A through 4D show inverted formation parameters from fractured formation with variable width (or diameter).
Figure 4C:
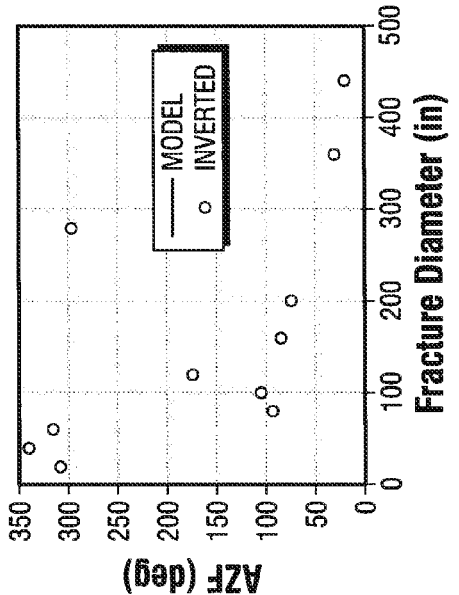
Figure 4B:
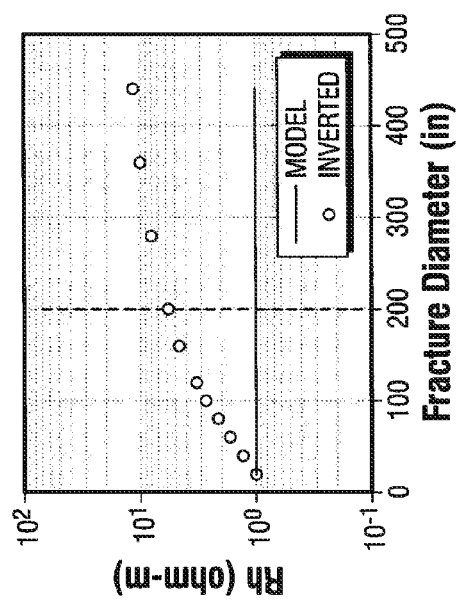
Figure 4D:
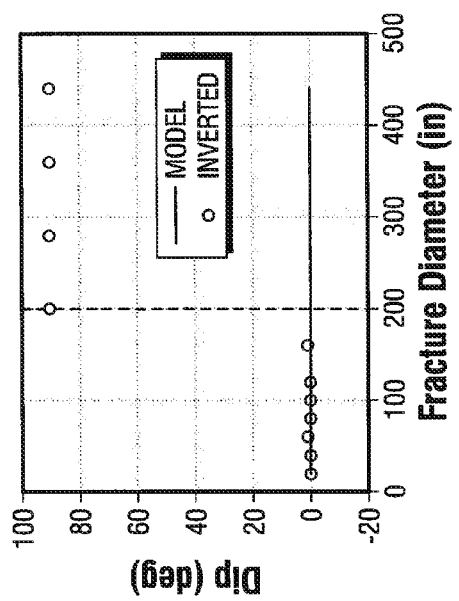

In example methods according to the present invention, a fracture may be modeled as a thin planar structure filled with electrically non-conductive fluid (e.g., oil based mud "OBM") embedded in a rock formation penetrated by a borehole (or wellbore, used interchangeably in the present description) through which a triaxial induction well logging tool may be operated. The mechanism for moving the triaxial induction logging instrument may be any type known in the art, e.g., drill pipe, armored electrical cable or slickline deployed from a winch, or coiled tubing. Accordingly, the manner of conveyance of the well logging instrument (FIG. 1) is not intended to limit the scope of the present invention. As will be appreciated by those skilled in the art, while the explanation of the modeling procedure and results are described with reference to a triaxial electromagnetic induction instrument, the method is equally applicable to triaxial electromagnetic propagation measurements such as would be made by certain logging while drilling ("LWD") instruments. Accordingly, the invention is defined in scope by the using of triaxial "electromagnetic" measurements, which term is intended to include both induction and propagation type measurements.

The size and the position of a fracture relative to a wellbore can be described by the following parameters:
1. Fracture width (or diameter if the fracture is centered around the borehole)
2. Fracture height
3. Fracture dip
4. Fracture orientation (or fracture strike direction)
5. Fracture displacement (distance to the center of the borehole with fracture plane parallel to the borehole axis)

In additional to the foregoing fracture parameters, the triaxial induction (FIG. 1) tool response also depends on the formation/borehole parameters: vertical and horizontal; resistivity, formation dip angle with respect to the tool axis, formation azimuth with respect to a tool reference, mud resistivity, wellbore diameter, tool eccentering and azimuthal angle ($\sigma h$, $\sigma v$, $\theta$, $\Phi$, $\sigma mud$, hd, decc, and $\psi$, respectively).

A finite element code may be used to model the response of the triaxial induction tool in a fractured formation, and was so used for purposes of the present invention. A large number of cases were computed to provide a substantial range of data concerning the effect of fracture on the expected triaxial induction instrument measurements. These modeled data may also used to develop methods and algorithms for detecting the existence of a large fracture and its orientation from triaxial induction measurements.

The modeled data were first processed by the RADAR inversion procedure, which uses a uniform formation model without the presence of a fracture. Other zero-dimensional inversion algorithms that solve from Rh, Rv, dip and azimuth can be used, as will be appreciated by those skilled in the art, including, for example, that described in commonly-owned PCT International Application No. WO2013/036509. The presence of the fracture would perturb the RADAR inverted parameters from the state of those computed for the rock formation alone without the fracture. Usually, it is very difficult or impractical to detect the existence of small, arbitrarily oriented fractures from the triaxial induction measurements. The incursion of a small, non-conducting fracture in the formation is not expected to have any significant effect on the measurements made by the triaxial induction instrument. However, a large fracture of certain orientation may be able to block a significant portion of the induced current between certain of the nine transmitter and receiver components (for each TR pair) in the triaxial induction instrument. In this case, the effect of the fracture may dominate the triaxial induction instrument's response and therefore can readily be detectable. The pattern of deviation of the inverted parameters can be used to help define the class of fractures which can be detected robustly using the triaxial induction instrument measurements.

1. Fracture Response
1.1 Effect of Fracture Width

FIG. 3 shows a cross sectional view illustrating a thin planar fracture 12 centered in a wellbore 14 with a triaxial induction logging tool 10 disposed therein. The formation surrounding the instrument is anisotropic with Rh=1 ohm-m and Rv=5.625 ohm-m. The dip and azimuth of the anisotropic formation are set to zero. The height of the fracture plane 12 is set to 200 in. To illustrate the effect of the fracture width, 11 cases of modeled data were made with the width of the fracture plane varying from 20 in. to 440 in.

The model data were processed with the RADAR inversion technique and the inverted formation parameters (Rh, Rv, Dip and Azimuth) are plotted as functions of fracture diameter (horizontal axis) in FIGS. 4A through 4D. The inverted parameters are circles and the model parameters are plotted as solid curves. For small fracture width of 20 in. (the first data point), the inverted Rh, Rv, Dip and Azimuth match the corresponding model parameters very well in all cases. Notice that the modeled dip angles for all 11 cases are zeros. Therefore, the dip azimuth is undefined in a formation without a fracture. In other words, any azimuth value would fit the model data. As the width of the fracture increases, however, the inverted Rh (top left) increases steadily while the inverted Rv (top right) fluctuates within a small range until the fracture width reaches about 200 in. As the fracture width increases further beyond about 200 inches, both the Rh and Rv increase steadily but the rate of increase tapers off rapidly for larger fracture width. The inverted dip angle (bottom left) remains to be the model dip value (zero) until the width reaches 200 in., above which all the inverted dips flip to 90 degrees. The inverted azimuth appears to be quite random for small fracture width. The azimuth appears to drift toward zero at large fracture width. The zero azimuth value here is actually the azimuth of the fracture plane.

The modeling results shown in FIGS. 4A through 4D suggest that a vertical fracture having width smaller than about 20 inches has negligible effect on the triaxial induction measurements, such that the RADAR inversion program can accurately invert for the modeled formation parameters i.e., Rv, Rh, $\theta$, $\Phi$. For vertical fracture width greater than 200 in., the effect of fracture would dominate the triaxial induction instrument response such that the RADAR program's inverted dip would calculate to be 90 degrees and the Rh will approach Rv as in the case of a higher resistivity isotropic formation. The effect of large vertical fractures clearly would be expected to cause a higher apparent Rh. How high the apparent Rh will be may depend on the thickness and resistivity of the fracture. The result that RADAR program inverted Rh only approaches Rv and does not exceed Rv may be an artifact caused by the internal constraint of the RADAR inversion algorithm.

Figure 5:
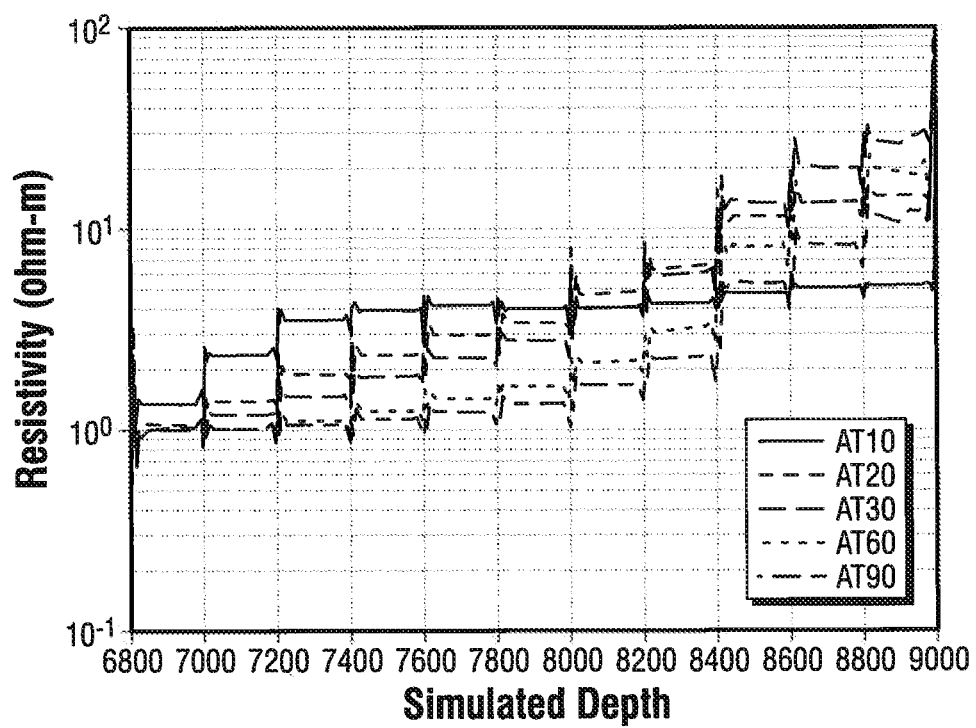
FIG. 5 shows example AIT logs from fractured formation with variable width (or 2*radius).

FIG. 5 shows the expected axial array induction well logging instrument ("AIT") (which has only longitudinal magnetic dipole antennas parallel to the instrument axis) various axial resolution curves (AT10 through AT90) for the same 11 cases of modeled fractured anisotropic formation described above. The horizontal axis is simulated depth which spans 200 feet for each case. The AIT simulated curves are obtained by repeating the data for each case 200 times to build a simulated depth frame file and then processed with a AIT resistivity calculation algorithm that is used commercially by affiliates of the assignee of the present invention. The fracture causes substantial spreading of calculated values of the AIT curves. For smaller fracture width (<100 in.), the shallower curve is higher than the deeper curve, very much like a resistive invasion pattern (wherein a resistive fluid invades pore space of a permeable formation having conductive connate water in the pore spaces). In this range, the RADAR inversion program Rh value is about the same as the AIT's AT10 curve or AT20 curve, while the deeper AT30, AT60, and AT90 AIT curves remain much closer to the modeled Rh than the RADAR inversion determined Rh value. At large fracture width (>200 in), the AIT curves show large non-monotonic spreading of values and all the AIT curves have substantially higher value than the modeled Rh. The shallow AT10 curve appears to be saturated at fracture widths larger than 100 in., i.e., the AT10 curve no longer increases in value with increase in the fracture width. The AIT curve order for large fracture width generally is that AT10 through AT30 are increasing while AT60 and AT90 generally are decreasing. The AT10 curve could be higher than the AT90 curve or vice versa depending on the fracture width.

1.2 Effect of Fracture Height

Figure 6:
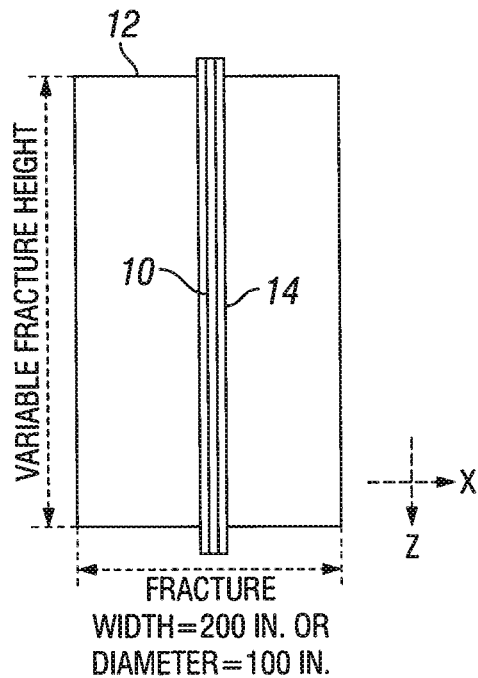
FIG. 6 shows a planar fracture model with variable height.

FIG. 6 shows a diagram illustrating a thin planar fracture 12 centered on a wellbore 14 with a well logging tool 10 therein. The formation is anisotropic with Rh=1 ohm-m and Rv=5.625 ohm-m. The dip and azimuth of the anisotropic formation are set to zero. The width of the fracture plane is 200 in. To illustrate the effect of the fracture height, 11 cases of model data with the height of the fracture plane varying from 80 in. to 440 in. were calculated.

The model data were processed with the RADAR inversion program and the inverted formation parameters (Rh, Rv, Dip and Azimuth) are plotted as functions of fracture height (horizontal axis) in FIGS. 7A through 7D. The inverted parameters are circles and the model parameters are plotted as solid curves. Starting from a fracture height of 80 in. (the first data point), the inverted Rh, Rv, begin to approach saturation point beyond which further increase in fracture height does not change the inverted Rh and Rv values. The inverted data suggest that the saturation point of the fracture height is about 200 in. For all the cases in the present fracture height modeling series, the RADAR program produces almost isotropic resistivity values, namely, Rh approaches Rv. This is believed to be due to an artifact of an internal constraint in the RADAR inversion program algorithm as explained in section 1.1 above. The inverted dip angle for these cases (where Rh~Rv) tends to be unstable, mostly 90 degrees or zero.

Figure 8:
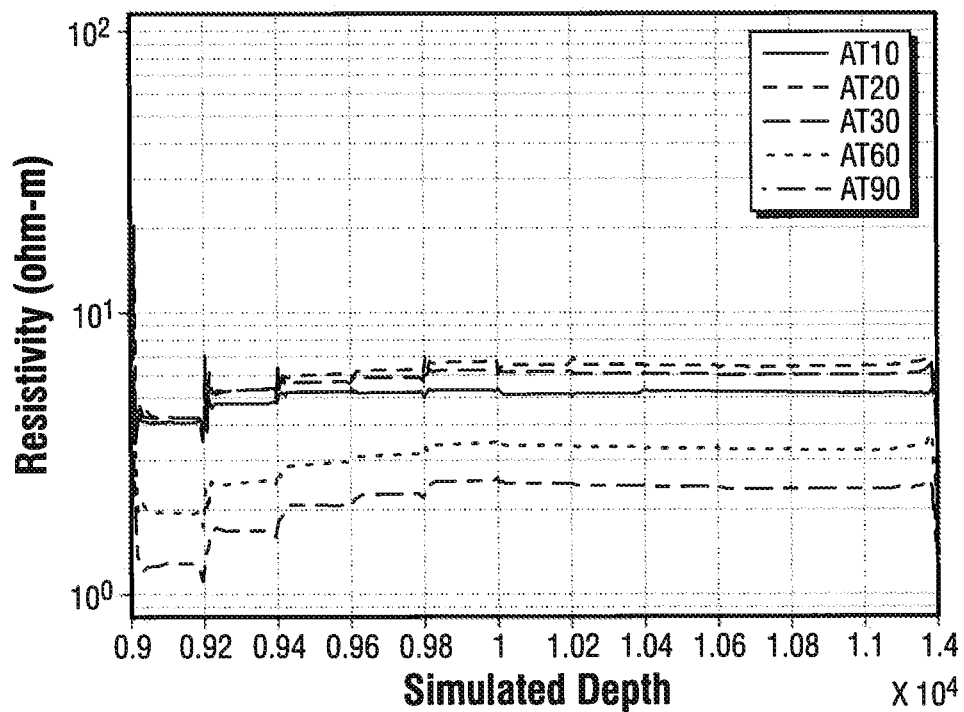
FIG. 8 shows AIT logs from fractured formation with variable height.

FIG. 8 shows the modeled AIT curves (AT10 through AT90) for these same 11 cases of modeled fractured anisotropic formation. The horizontal axis is simulated depth which spans 200 for each case. The AIT simulated curves (AT10 through AT90) are obtained by repeating the data for each case 200 times to build a simulated depth frame file and then processed with the commercially used AIT algorithm mentioned above. The fracture causes substantial spreading of the AIT curve values. The shallowest response (AT10 curve) increases quickly with fracture height and appears to be saturated around fracture height of 120 in. The AT10 curve stays essentially constant for larger fracture height. The deeper reading AIT curves behave similarly but saturate at larger fracture heights. The AT90 curve saturates at fracture height of about 240 in. The curve order for large fracture height generally is that AT10 and AT20 are generally increasing and AT30, AT60 and AT90 are generally decreasing.

Based on the modeling of fracture width and height, it may be concluded that planar fractures of size 200 by 200 in. can be considered as large fractures which would dominate the responses of the triaxial induction instrument measurements as well as conventional uniaxial induction measurements. From this point on in the present description, the size of the fracture plane will remain 200 by 200 in. as representative of a large fracture.

1.3 Effect of Fracture Dip

Figure 9:
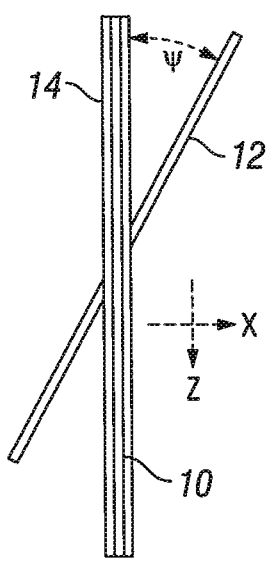
FIG. 9 shows a large planar fracture model with variable dip angle.

FIG. 9 shows a diagram illustrating a large (200×200 in) thin planar fracture 12 intersecting a wellbore 14 having a triaxial induction well logging instrument 10 therein. The fracture has a dip angle $\psi$ with respect to the longitudinal (z-axis) of the wellbore. The formation is anisotropic with Rh=1 ohm-m and Rv=5.625 ohm-m. The dip and azimuth of the anisotropic formation are set to zero. To illustrate the effect of the fracture dip, 13 cases of model data with the dip of the fracture plane varies from 0 to 180 degrees in 15 degrees increment were calculated. Fracture dip of 90 degrees is a horizontal fracture while fracture dip of 0 or 180 degrees is a vertical fracture.

The model data were processed with the RADAR inversion program and the inverted formation parameters (Rh, Rv, Dip and Azimuth) are plotted as functions of fracture dip (horizontal axis) in FIGS. 10A through 10D. The inverted parameters are circles and the model input parameters are plotted as solid curves. At fracture dip of 90 degrees (horizontal fracture), the RADAR inversion produces inverted Rh and dip values matching the formation Rh and dip, consistent with the expectation that horizontal fracture is having no substantial effect on RADAR inversion results. However, the RADAR program inverted Rv generally as expected to a have higher value (compared with the formation Rv) for most fracture dip angles other than vertical. As the fracture plane gradually tilts toward vertical (0 or 180 deg.), the inverted Rh values approach the Rv values and the inverted dip toward 90 degrees in a symmetric pattern centered around fracture dip of 90 degrees. For purposes of clarification "vertical" as used in this discussion shall mean parallel with or coaxial with the longitudinal axis of the wellbore 14. The results depend only on the relative angle between the fracture plane and the wellbore axis, and not the fixed geodetic vertical reference.

Figure 11:
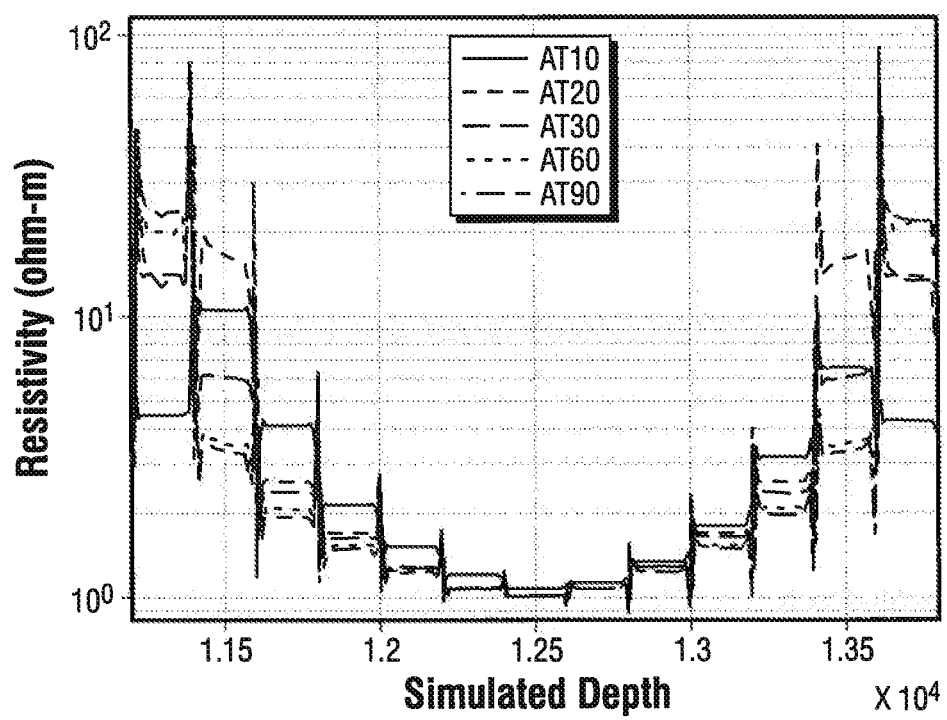
FIG. 11 shows AIT logs from fractured formation with variable dip, the formation dip and azimuth are zero.
Figure 12A:
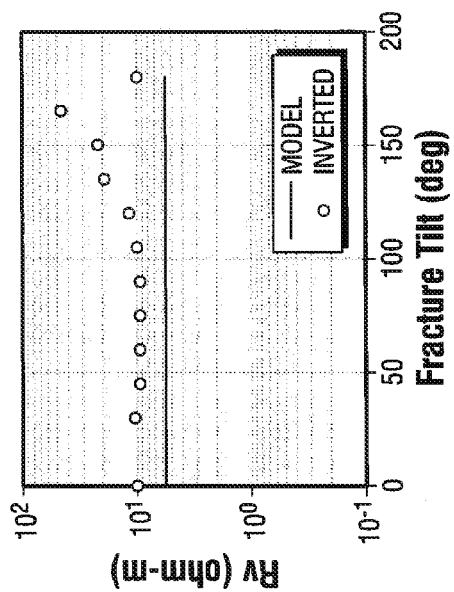
FIGS. 12A through 12D show inverted formation parameters from fractured formation with variable dip, the formation dip and azimuth are 50 and 225 degree, respectively.
Figure 12B:
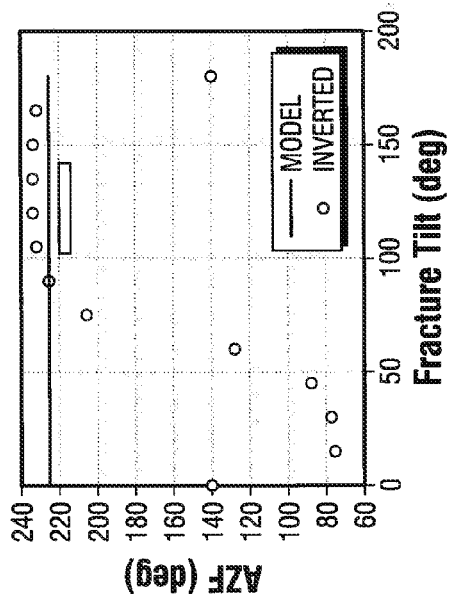
Figure 12C:
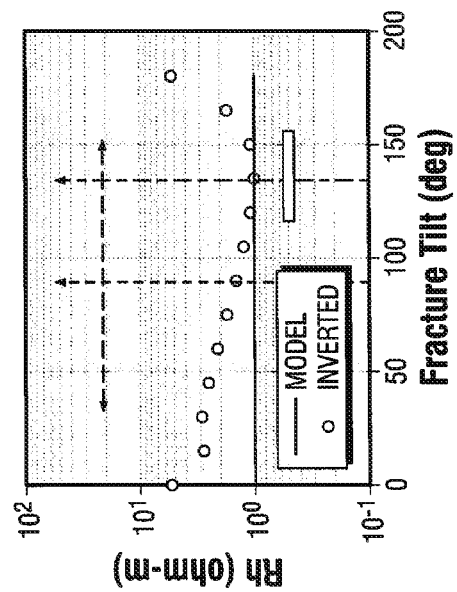
Figure 12D:
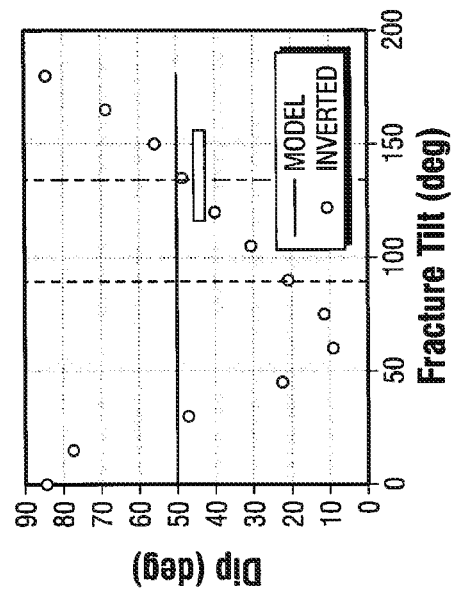

FIG. 11 shows calculated AIT curves (AT10 through AT90) for these same 13 cases of model fractured anisotropic formation. The vertical fracture (fracture dip=0 or 180) causes substantial spreading of the AIT curves. The spread of the AIT curves tapers to a minimum at fracture dip of 90 degrees (horizontal fracture). The curve order for large vertical fracture height generally is that AT10 through AT30 are increasing and AT60 through AT90 are decreasing.

To demonstrate the effect of relative dip and azimuth between the fracture plane and the anisotropic formation, another 13 cases were modeled of varying fracture dip angle for the same anisotropic formation but with formation dip and azimuth changed to 50 and 225 deg., respectively. The RADAR inverted formation parameters (Rh, Rv, Dip and Azimuth) for this data set are plotted as functions of fracture dip (horizontal axis) in FIGS. 12A through 12D. The inverted parameters are circles and the model parameters are plotted as solid curves. The symmetric "bowl" shape of Rh and Dip as shown for cases of horizontally layered formations in FIGS. 10A through 10D are now distorted significantly. The fracture dip angle, at which the inverted Rh and Dip matching the formation Rh and Dip, are shifted to 135 degree. 135 degrees appears to be the angle at which the fracture plane is closest to parallel the formation Rh direction. Departure from this angle as the fracture plane tilts toward vertical (0 or 180 deg.), the previously noted large vertical fracture effect appears, namely inverted Rh and Rv both are elevated substantially and the inverted dip tends toward 90 degrees.

Figure 13:
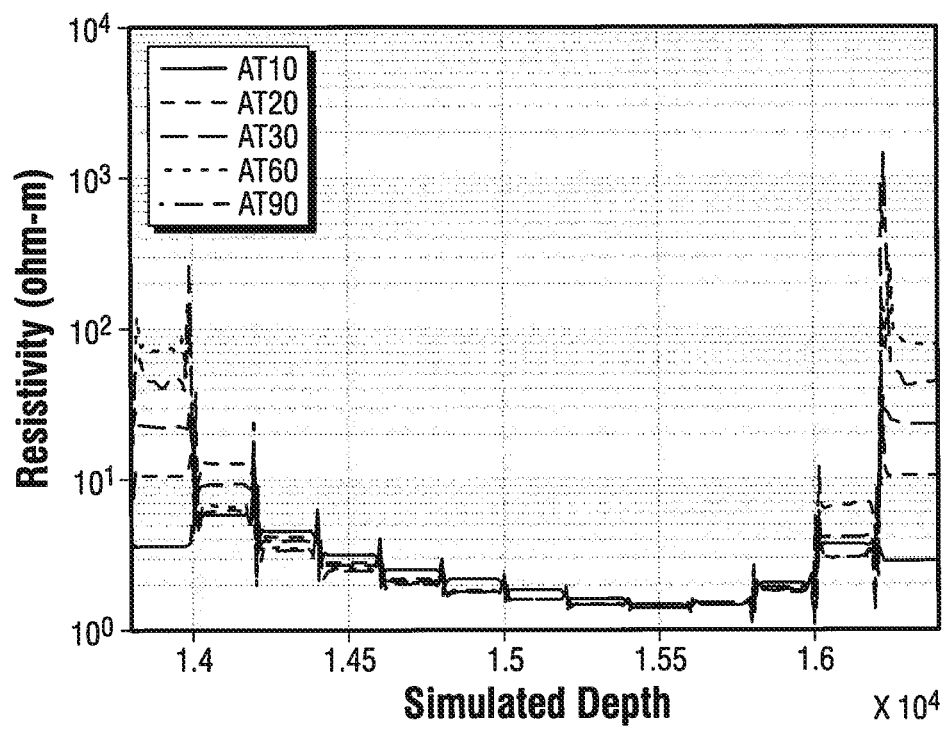
FIG. 13 shows AIT logs from fractured formation with variable dip, the formation dip and azimuth are 50 and 225 degrees, respectively.

The calculated AIT curves (AT10 through AT90) for these 13 cases of model fractured anisotropic dipping formation are shown in FIG. 13. The vertical fracture (fracture dip=0 or 180) causes substantial spreading of the AIT logs. The spread of the AIT logs tapers to minimal at fracture dip 135 degrees where the fracture plane is closest to parallel to the Rh direction of the anisotropic formation. The curve order for large vertical fracture is similar to those for the horizontally layered formation cases except the turning point is shifted to AT60 instead of AT30.

1.4 Effect of Fracture Strike Angle

Figure 14:
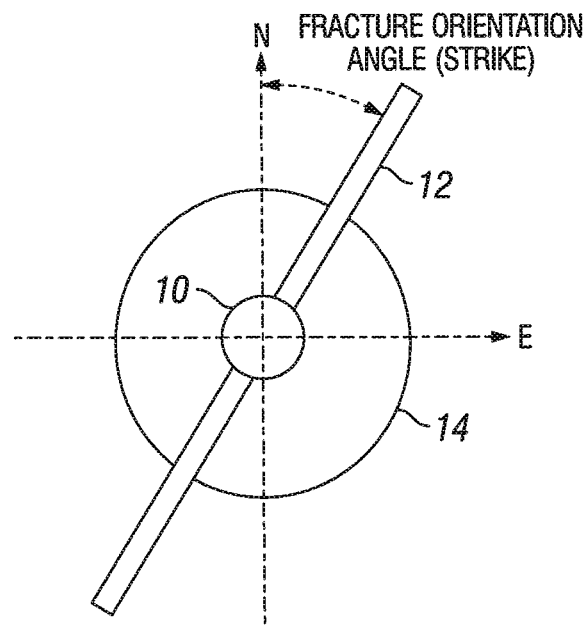
FIG. 14 shows a large vertical planner fracture model with variable strike angle.

FIG. 14 shows a diagram illustrating a large (200×200 in) thin vertical planar fracture 12 intersecting a wellbore 14 having a triaxial induction well logging instrument 10 centered therein. The fracture has a predetermined strike angle with respect to the geodetic north direction (or x-axis on the instrument after appropriate rotation). The formation is anisotropic with Rh=1 ohm-m and Rv=5.625 ohm-m. The dip and azimuth of the anisotropic formation are set to zero. To illustrate the effect of the strike angle, 7 cases of model data with the strike of the fracture plane varies from 0 to 180 degrees in 30 degrees increment were calculated.

The model data were processed with the RADAR inversion program and the inverted formation parameters (Rh, Rv, Dip and Azimuth) are plotted as functions of fracture dip (horizontal axis) in FIGS. 15A through 15D. The inverted parameters are red circles and the model parameters are plotted as solid blue curves. The results indicated that RADAR inverted Rh, Rv, and Dip are almost independently of the strike of the vertical fracture. The effect of the vertical fracture pushes the Rh value up toward Rv. It appears that the inverted Rv match the formation Rv and the inverted dip is approaching 90 degree. The inverted azimuth (AZF) appears to be random, not reflecting the azimuth of the fracture at all, perhaps due to the fact that in the RADAR inversion program the model dip and azimuth is undefined in nearly isotropic formation (Rh~Rv).

1.5 Effect of Fracture Displacement

Figure 16:
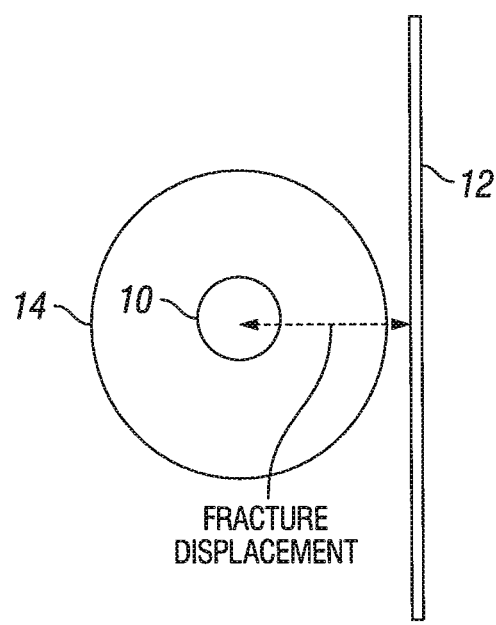
FIG. 16 shows a large vertical planar fracture model with variable displacement from the center of the borehole.
Figure 17A:
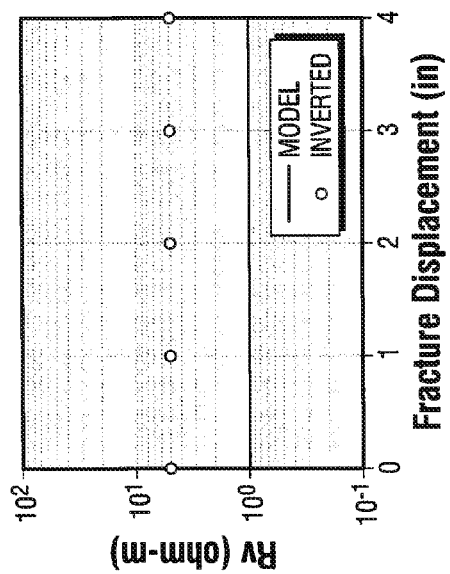
FIG. 17A through 17D show inverted formation parameters from large vertical fractured formation with variable displacement.
Figure 17B:
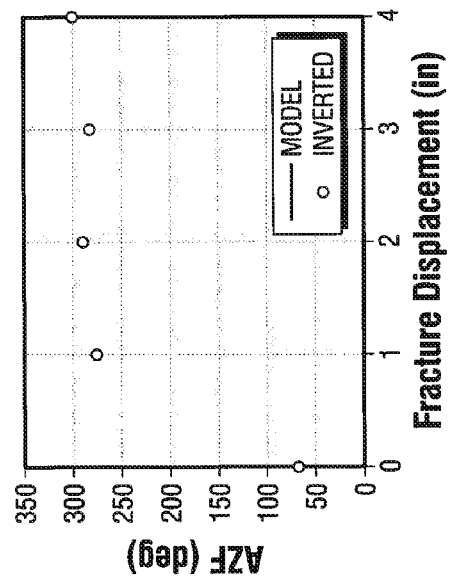
Figure 17C:
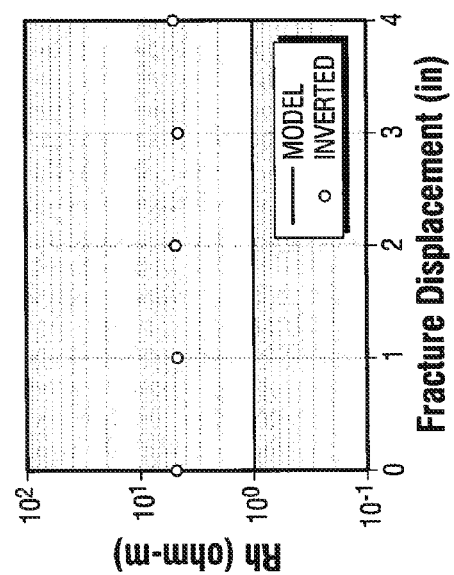
Figure 17D:
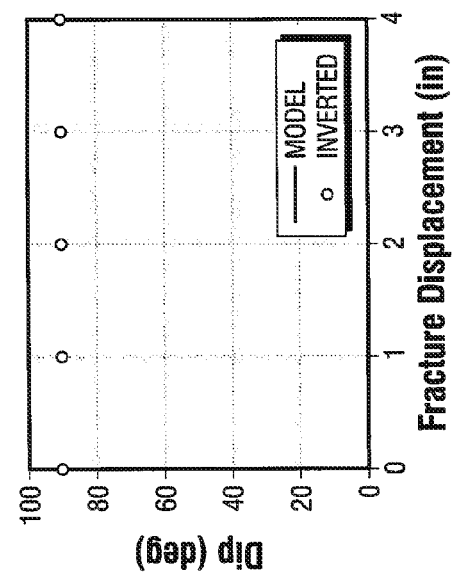

FIG. 16 shows a diagram illustrating a large (200×200 in) thin vertical planar fracture 12 having a strike angle of zero, and which is laterally displaced from the center of the wellbore 14. The formation is anisotropic with Rh=1 ohm-m and Rv=5.625 ohm-m. The dip and azimuth of the anisotropic formation are set to zero. For this model 5 cases of lateral displacement were calculated from 0 to 4 in. in step of 1 in.

The model data were processed with the RADAR inversion program and the inverted formation parameters (Rh, Rv, Dip and Azimuth) are plotted as functions of fracture dip (horizontal axis) in FIGS. 17A through 17D. The inverted parameters are circles and the model parameters are plotted as solid curves. The results indicated that the RADAR program inverted Rh, Rv, and Dip are almost independent of small displacement from the center of the borehole. All 5 cases have about the same inverted Rh, Rv, and Dip. This suggests that small variation of displacement of order of the borehole diameter will have the same effect on the triaxial measurement.

2. Fracture Detection and Fracture Orientation (Strike) Determination

Figure 18A:
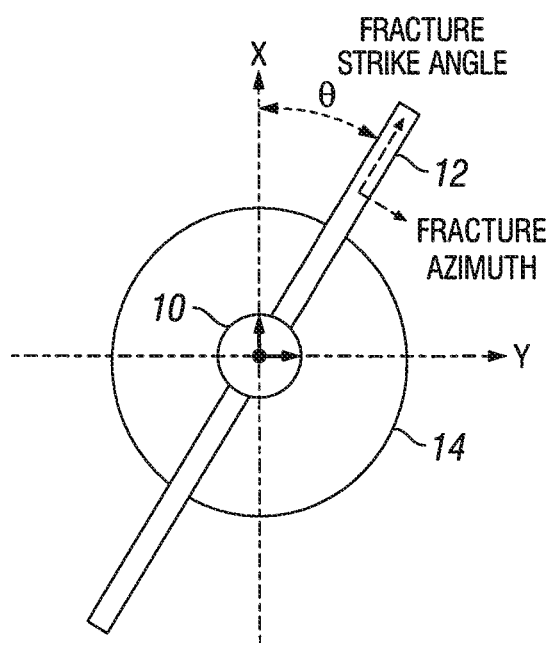
FIGS. 18A and 18B show a large vertical planar fracture model with a triaxial induction tool in plan and side view, respectively.
Figure 18B:
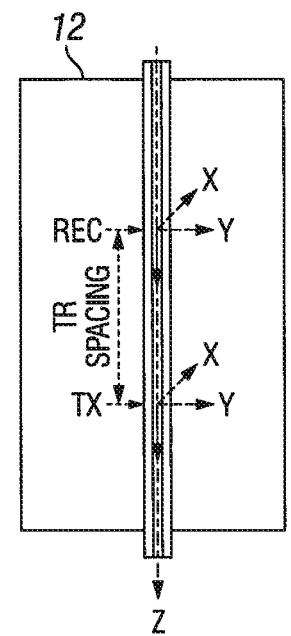

In this section a method will be described for detecting large vertical fracture and an algorithm to compute the strike angle of the large vertical fracture. FIG. 18 is a simple diagram illustrating the top and side view of a vertical fracture 12 centered on a wellbore Assume for this example the X-coordinate of the well logging instrument 10 is pointing toward geodetic north to simplify the determination of the results. The Y-coordinate is pointing toward east and the Z-coordinate is pointing down in the side view and into the page in the top view. The triaxial transmitters and receivers are located on the instrument separated by a distance called the TR spacing. Physical intuition suggests that the most sensitive components in the conductivity tensor to detect the presence and its orientation of the large vertical fracture are the components in the plane perpendicular to the fracture plane. Based on careful observation of many model data of fractured anisotropic formation, it has been determined that in the presence of a large vertical fracture, the far field (i.e., with larger TR spacing, such as TR=72 in.) transverse coupling of the measured triaxial conductivity tensor will have the following relation with the fracture strike angle $\theta$:

$$\sigma xx = A + B*\cos(2\theta) \quad (1)$$

$$\sigma yy = A - B*\cos(2\theta) \quad (2)$$

$$\sigma xx_{45} = A - B*\sin(2\theta) \quad (3)$$

Here $\sigma xx_{45}$ is the xx component of the measured apparent conductivity tensor, $\sigma_a$, rotated 45 degree around z-axis. The rotated conductivity tensor, $\sigma_{ar}$, is given by the following expression.

$$\sigma_{ar} = R\sigma_a R^T, \quad (4)$$

$$\sigma_a = \begin{bmatrix} \sigma_{xx} & \sigma_{yx} & \sigma_{zx} \\ \sigma_{xy} & \sigma_{yy} & \sigma_{zy} \\ \sigma_{xz} & \sigma_{yz} & \sigma_{zz} \end{bmatrix},$$

$$R = \begin{bmatrix} \cos(\phi) & \sin(\phi) & 0 \\ -\sin(\phi) & \cos(\phi) & 0 \\ 0 & 0 & 1 \end{bmatrix}$$

R is the rotation matrix and the rotation angle $\phi=45$ degrees.

In equations (1)-(3), the A and B are functions of the fracture parameters (FD, FW, FH) and the borehole/formation parameters (Rh, Rv, Dip, decc, azf, azt).

A(FD, FW, FH, Rh, Rv, Dip, decc, azf, azt)
B(FD, FW, FH, Rh, Rv, Dip, decc, azf, azt)

The following are the notation for various parameters above

FD—fracture displacement
FW—fracture width
FH—fracture height
Rh—formation horizontal resistivity
Rv—formation vertical resistivity
Dip—the dip angle of the anisotropy
azf—the dip azimuth angle of the anisotropy
decc—tool eccentering distance
azt—the tool eccentering orientation angle From equations (1)-(3), it is possible to solve for B and the fracture strike angle $\theta$ as follows:

$$\theta = 0.5*\tan^{-1}[(\sigma xx + \sigma yy - 2*\sigma xx_{45})/((\sigma xx - \sigma yy)] \quad (5)$$

$$B = 0.5*(\sigma xx - \sigma yy)/[\delta + \cos(2\theta)] \quad (6)$$

The $\sigma$ in equation (6) is a very small constant for the purpose of preventing the denominator from being zero.

Figure 19A:
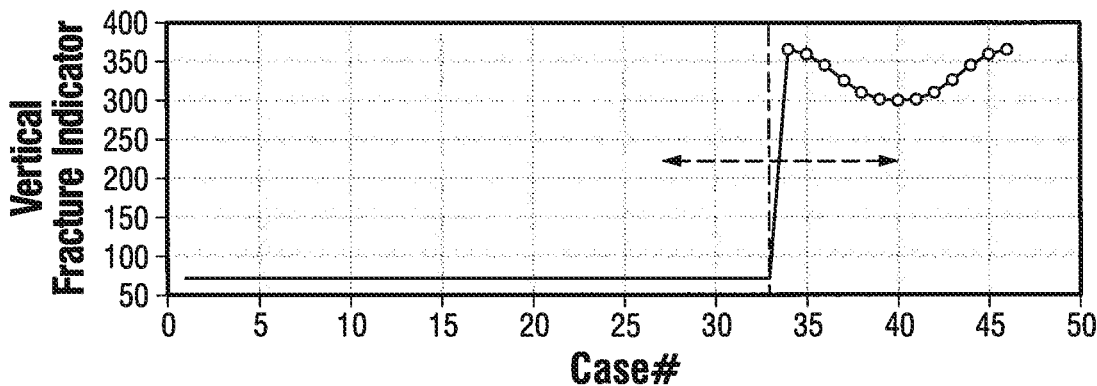
FIGS. 19A and 19B show a model example illustrating using equation (5) and (6) (B and θ) for fracture indicator flag and fracture orientation, respectively.
Figure 19B:
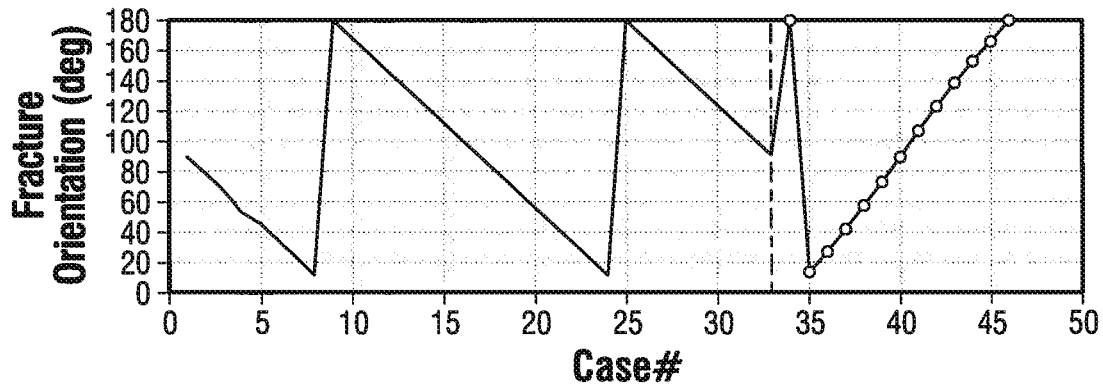

Many modeling cases show that the value of B is a strong function of FR, RH, Rh, and Dip. The B value for formations with large vertical fractures is much larger than that for the same formation without large fractures. The magnitude of B can therefore be used to indicate the existence of large vertical fractures. Shown in FIG. 19A is an example of B, plotted as fracture indicator flag (FF), and $\theta$, plotted on FIG. 19B as fracture orientation (FO). The foregoing values were computed using equations (5) and (6) for data modeling an anisotropic formation with Rh=1 ohm-m, Rv=5.626 ohm-m. The anisotropy dip in the model is 50 degrees, and the dip azimuth varies from 0 to 360 in steps of 11.25 degrees. As a reference, the first 33 cases are from triaxial induction well logging data but for an anisotropic formation without any fractures. Subsequently, the same anisotropic formation but with a large vertical fracture of size 200×200 in. centered on the borehole is modeled. The next 13 cases are for fractured formation with the strike of the vertical fracture varied from 0 to 180 degrees in steps of 15 degrees. This example demonstrates that there is clear distinction in the magnitude of B between formations with or without a fracture to make a robust detection. In the high FF zone, equation 5 correctly predicts the fracture orientation for all 13 cases. Notice that the first fracture case (case #34) the computed FO values is 180 which yields the same physical fracture orientation as FO=0. In the low FF zone where there is no large vertical fracture, the FO has no meaning and should be ignored.

Figure 20A:
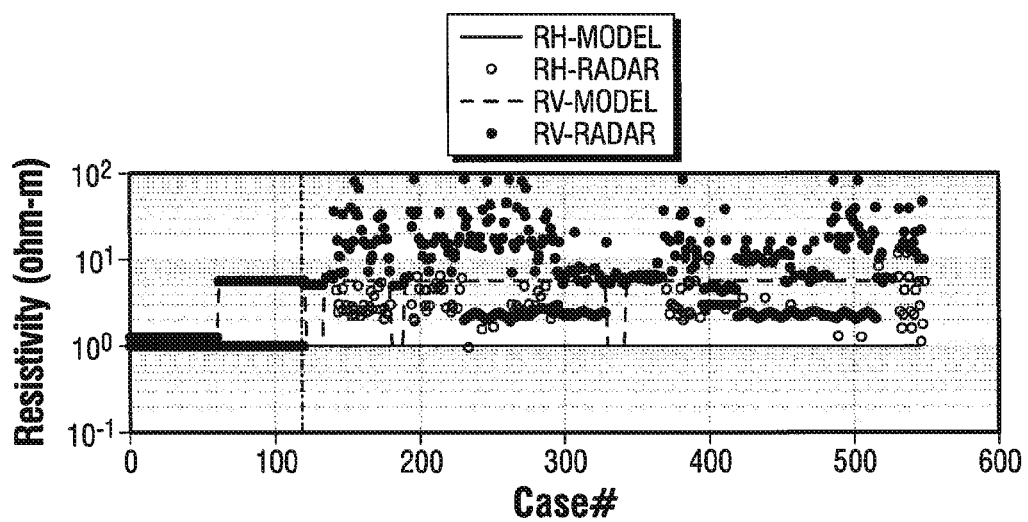
FIGS. 20A and 20B show model parameters and RADAR inversion results for model cases used to illustrate the robustness using equation (5) and (6) (B and θ) for the fracture indicator flag and fracture orientation when formation dip, azimuth, Rv, decc, and azt are varying.
Figure 20B:
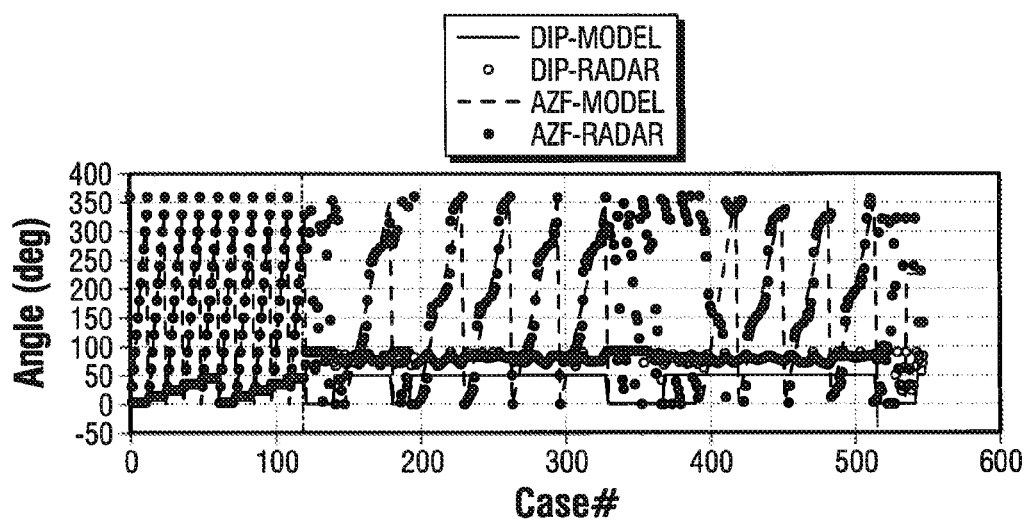

Several hundred cases of large (200×200 in.) vertical fracture of various strike angle θ and formation dip, azf, Rv/Rh ratio, decc, and azt were modeled to investigate the effects of the variation of the formation/borehole parameters to the robustness of the fracture detection and fracture orientation algorithms of Eq. (5) and (6). These cases are assembled together with 120 control cases of anisotropic formation without fractures. Cases 1 through 120 are anisotropic formation without fracture, all with Rh=1 ohm-m. Cases 1-60 are low anisotropy ratio formation with Rv=1.25 while cases 61-120 are higher anisotropy ratio formation with Rv=5.625 ohm-m. The low and high anisotropy ratio formations are further divided into 5 groups for dip angle variation from 5 degrees to 45 degrees in step of 10 degrees. Each dip angle group consists of 12 cases for dip azimuth variation from 0 to 330 in steps of 30 degrees. Following the cases of formation without any fractures, cases 121 through 549 are 429 model cases including a large vertical fracture in formation with various Rh, Rv, dip, azf, decc, and azt. The modeling parameters for all these cases are shown in FIGS. 20A and 20B as solid lines together with RADAR program inverted model parameters as small circle and * symbols in these same figures. The resistivity, Rh and Rv, are plotted on FIG. 20A and the dip and azimuth angle are plotted on FIG. 20B. For the no fracture cases (1-120), the inverted parameters from the RADAR inversion program match perfectly with the model parameters as expected. The effects of the large vertical fracture in cases 121 through 549 on the RADAR inversion program output are generally manifested in two aspects: First, the inverted Rh and Rv are biased high. If the dip of the formation is zero, the Rh will be increased toward Rv such that the formation appears to be a higher resistivity isotropic formation. Second, the inverted dip is increasing toward 90 degrees.

Figure 21A:
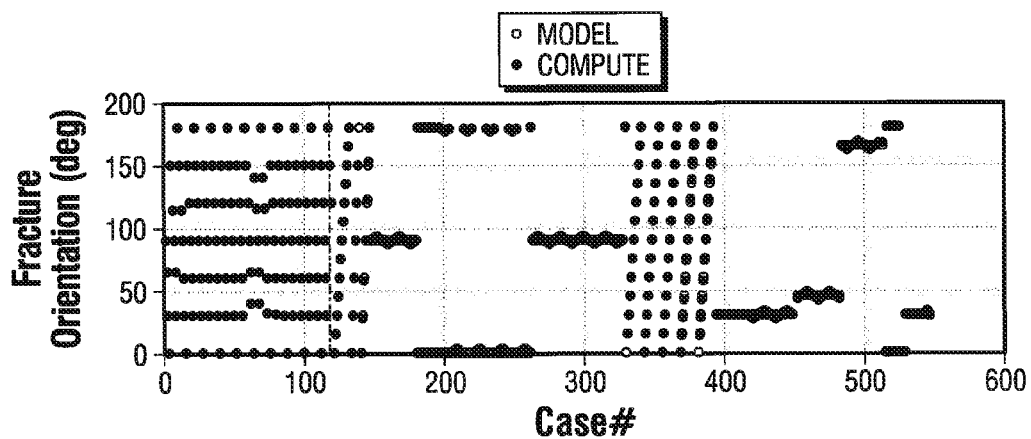
FIGS. 21A and 21B show model examples illustrating the robustness using equation (5) and (6) (B and θ) for the fracture indicator flag and fracture orientation when formation dip, azimuth, Rv, decc, and azt are varying.
Figure 21B:
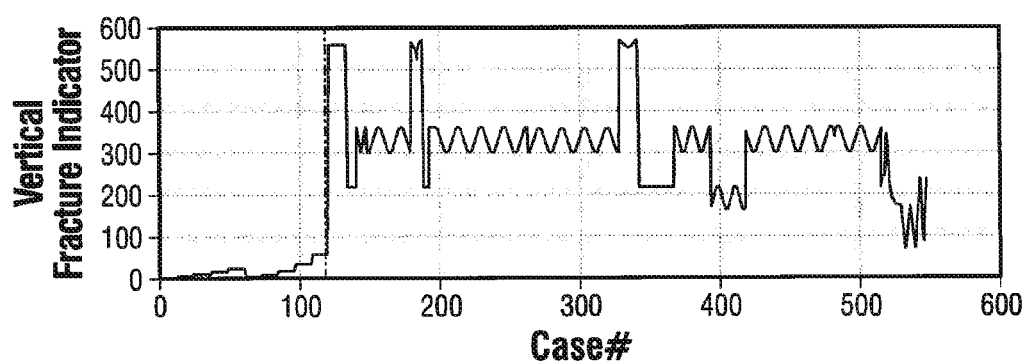

The fracture orientation (FO, or fracture strike θ) and vertical fracture indicator flag (FF, or the B value) for these same 549 test cases are shown in FIGS. 21A and 21B. The computed FO is on FIG. 21A as asterisks * while each model value is displayed as a circle. The FF is on FIG. 21B. For the first 120 no fracture cases, the FF is generally increases with the dip and anisotropy but has a lower amplitude compared with the fracture cases (case #121-549) where the formation have similar resistivity and dip. These modeling cases suggest that a robust threshold values can be derived to effectively flag zones having large vertical fracture. On the top track, for all the cases (case #121-549) with large vertical fracture the computed fracture orientation (*) match very closely with the model value (circle).

The threshold value of FF above which a large vertical fracture is considered to be present should be guided by modeling results. To establish an appropriate threshold value, 1000 cases of anisotropic formations without fractures were modeled. The model parameters for these cases are the followings:

| Borehole Diameter: | 7.19, 9.19, 13.38, 16.0 | in. |
|---|---|---|
| decc: | 1.25, 2.25, 4.50, 5.50 | in. |
| Rh: | 0.12, 0.21, 0.37, 0.66, 1.17, 2.07, 3.69, 5.65, 13.89, 43.93 | ohm-m |
| Rv/Rh: | 1.39, 2.46, 4.39, 7.81, 13.85 | |
| Dip: | 5, 15, 25, 35, 45 | degree |
| azf: | 0 | degree |
| azt | 0 | degree |

Figure 22A:
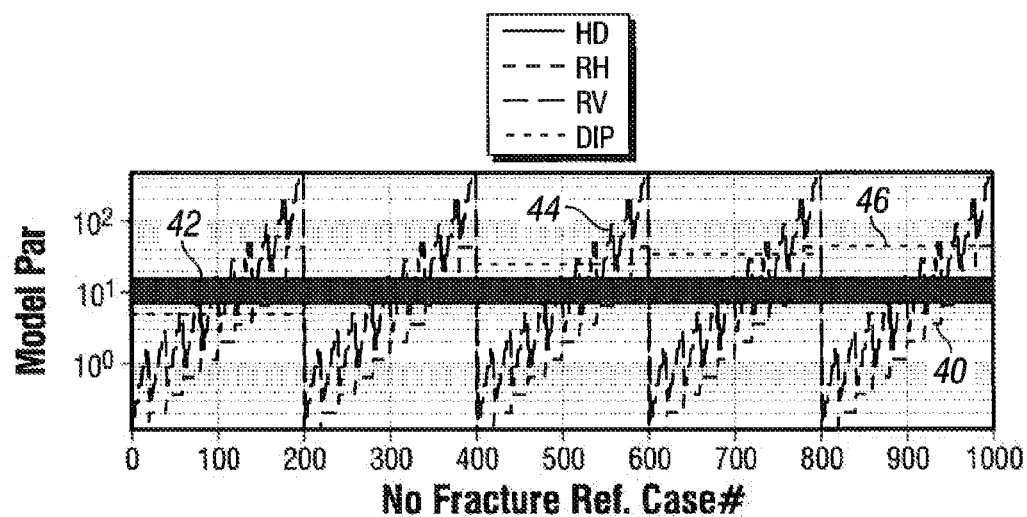
FIGS. 22A and 22B show model parameters and B values from model data of formations without fractures as guidance to set the threshold for the FF.
Figure 22B:
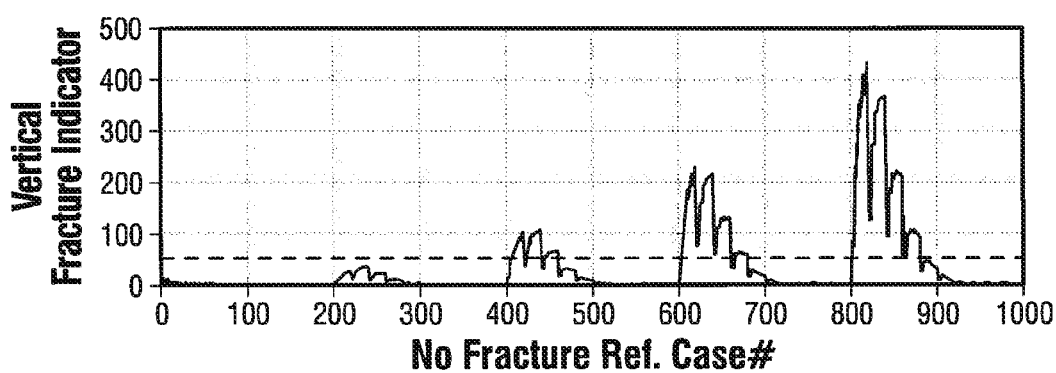

The B value (or FF) computed by Eq. (6) for the data from these 1000 cases together with the corresponding model parameters are shown in FIGS. 22A and 22B. The model parameters are on FIG. 22A and the FF value on FIG. 22B. On FIG. 22A, the hole diameter is curve 42, which is arranged also to be the most frequently varied parameter. The Rh is curve 40 which is arranged as the second frequently varied parameter. The Rv is curve 44 which is arranged as the third frequently varied parameter. The Dip is curve 46 which is arranged as the least frequently varied parameter. The test cases are arranged in a hierarchy group structure. There are 5 groups of cases corresponding to the 5 model Dip values. For each Dip value group, there are 10 subgroups corresponding to the 10 Rh values. For each Rh subgroup, there are 5 sub-subgroups corresponding to the 5 Rv/Rh ratio. For each Rv/Rh ratio group, there are 5 cases corresponding to the 5 hole diameters and decc value. The lower track shows that the FF increases quickly with dip angle. Within each dip angle group, the FF also increases rapidly as the Rh decreases. Within each Rh group, the FF increases quickly as the Rv/Rh ratio increases. Over all, without the presence of fractures, the FF for formation with Rh>1 ohm-m and dip angle less than 45 degrees, will be less than 50 as marked by the red dashed line. Therefore, 60 would represent a reasonable threshold value for FF over this wide range of formation conditions. For more conductive formations, the threshold value for FF may need to be adjusted higher, depending on model results when the formations are modeled as explained above.

Figure 23:
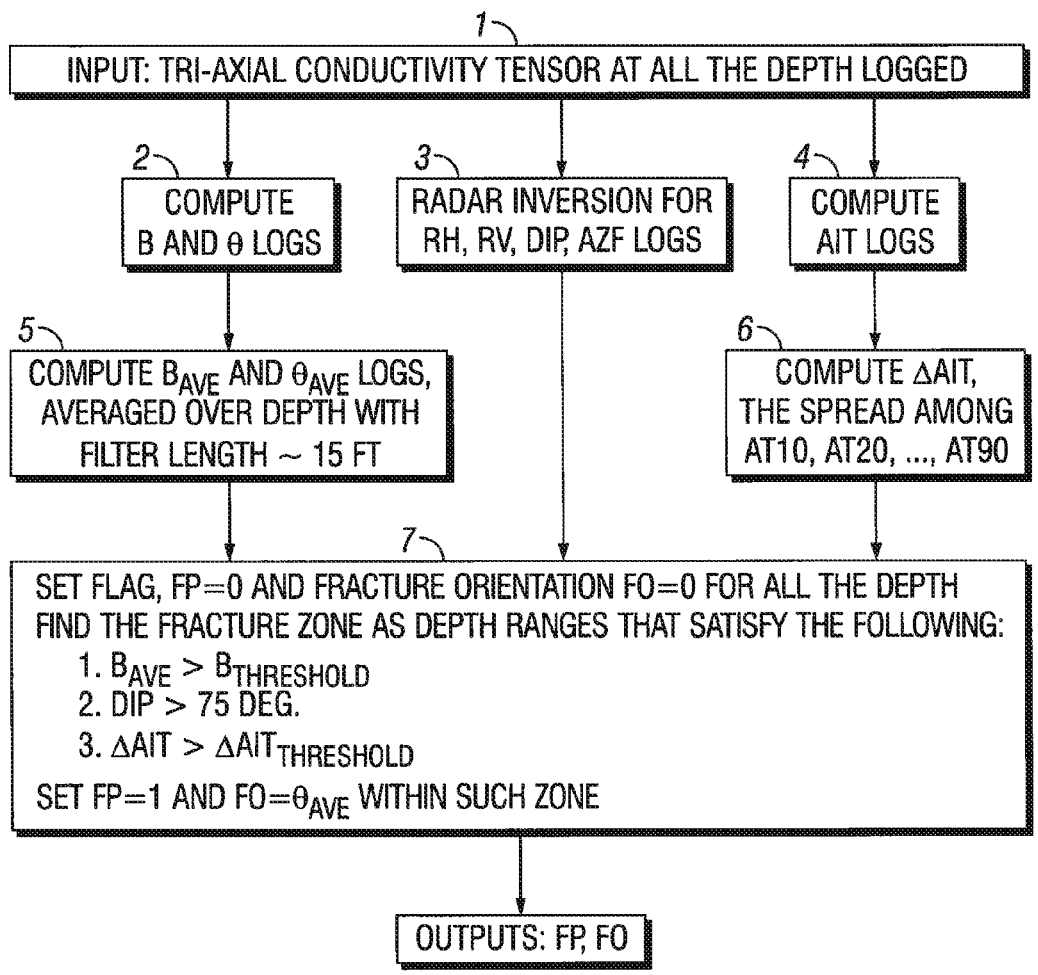
FIG. 23 is a flow chart of an example implementation of fracture detection and fracture orientation estimation.

FIG. 23 is a block diagram showing one way to implement the current algorithm for large vertical fracture detection and the fracture orientation estimation. The algorithm's input is the triaxial conductivity tensor as function of depth, shown at 1. The outputs are a fracture presence flag (FP) and fracture orientation (FO) as function of depth. The FP and FO are normally set to zero. In the depth zone where a large vertical fracture is detected, the FP will be set to 1 and FO will be set to the averaged value of fracture strike angle θ. This algorithm employs three major characteristics of large vertical fractures disclosed here to form the fracture flag (FP) and assign the averaged value of fracture strike angle θ to the FO.

The output from box 1 may be used to compute the B and θ logs as function of depth, as shown at 2. An averaging filter of length of order of the height of the large vertical fracture (such as 15 ft) is applied to the B and θ logs from box 2 to obtain averaged logs $B_{ave}$ and $θ_{ave}$ in as shown at 5. The same output from box 1 is used to perform inversion for formation properties using an algorithm such as RADAR inversion as shown at 3. At 4, the zz-component of the triaxial induction input may also be used to compute conventional axial dipole induction logs of various depth of investigation, such as the AT10, AT20, AT30, AT60, and AT90 curves from the AIT instrument. The spread of the AIT curves of various depth of investigation, ΔAIT, may be computed as function of depth as shown at 6. The $B_{ave}$ and $\theta_{ave}$ from 5, the Dip from 3 and the ΔAIT from 6 are entered into an algorithm for determining the FP and FO, as shown at 7. After an initialization step in which the FP and FO are set to 0 for all depth, the algorithm at 7 will search the input data $B_{ave}$, Dip and ΔAIT for depth zones in which the following three criteria are all satisfied:
1. $B_{ave} > B_{threshold}$
2. Dip>75 degrees
3. $\Delta AIT > \Delta AIT_{threshold}$ The $B_{threshold}$ value is derived from modeling of formations without fracture as described above. The 75 degree criterion for dip is based on response from RADAR inversion to many cases of modeled fractured formation presented in FIGS. 19A through 19D. The $\Delta AIT_{threshold}$ value is derived from many cases of modeled fractured formation presented above herein in sections 1 and 2. These three criteria are the most readily observable characteristics of large vertical fractures readily determinable from the triaxial induction measurement data. The zones in which the above three criteria are satisfied are assigned to be large vertical fracture zones. As will be appreciated by those skilled in the art, the three criteria in box 7 can also be used in any combination to achieve results of different degrees of robustness. Within the fracture zone, the fracture presence flag FP will be set to 1 and the fracture orientation FO will assign the value of $\theta_{ave}$. FP and FO may be outputted to be displayed with other logs to serve the following purposes:
1. To indicate the location of large vertical fracture zones so that proper measures could be taken to prevent or mitigate loss circulation.
2. To indicate the location of large vertical fracture zones, which is also the potential zones for high fracture permeability for oil and gas production.
3. To indicate the fracture orientation, which is normally in the direction of the minimum horizontal stress. The minimum horizontal stress direction is very important information in the geomechanics application to determine wellbore stability and to indicate the best way to drill through formation in such a stress field.
4. As a warning flag to indicate the inaccuracy of the logs from RADAR or AIT due to the influence of the fracture.

As stated, although the description above covers the use of wireline resistivity and triaxial induction tools as one embodiment, the same algorithm can be applied to resistivity measurements made with Logging While Drilling (LWD) electromagnetic propagation measurements, both axial and triaxial tools, or any tool embodiment from which Rh, Rv, dip, and azimuth can be inferred, The same application can be made on tools conveyed downhole in any manner e.g. by means of slickline, CTD, WDP, etc. All of the above can be implemented as real-time well site answer product as well as surface computer center product.

While the invention has been described with reference to a limited number of embodiments, those skilled in the art having the benefit of the foregoing description will readily devise other implementations that do not exceed the scope of the present invention. The present invention therefore shall be limited in scope only by the attached claims.

What is claimed is:

1. A method for determining existence of a fracture in a formation surrounding a wellbore drilled through subsurface rock formations, comprising:

deploying an electromagnetic logging tool in the wellbore, the electromagnetic logging tool including a triaxial transmitter and a triaxial receiver longitudinally spaced apart from one another;

causing the triaxial transmitter to transmit electromagnetic energy into the subsurface rock formations;

causing the triaxial receiver to receive said transmitted electromagnetic energy to obtain electromagnetic measurements such that the obtained electromagnetic measurements comprise responses between the triaxial transmitter of the electromagnetic logging tool and the triaxial receiver of the electromagnetic logging tool;

determining a fracture orientation value of the rock formations from only two measured responses of the electromagnetic logging tool in accordance with the following equation:

$$\theta = 0.5 \cdot \tan^{-1}[(\sigma xx + \sigma yy - 2\sigma xx_{45})/(\sigma xx - \sigma yy)]$$

wherein the two measured responses are transverse with respect to one another, and wherein θ represents the fracture orientation value, σxx represents an apparent conductivity of the one of the two measured responses, σyy represents an apparent conductivity of the other of the two measured responses, and $\sigma xx_{45}$ represents an apparent conductivity of the one of the two measured responses rotated by 45 degrees about an axial direction of the logging tool;

determining a fracture indicator value of the rock formations based at least partially upon the two measured responses and the fracture orientation value; and determining the presence of a fracture in the rock formations based upon the magnitude of the fracture indicator value.

2. The method of claim 1, wherein the fracture indicator value is determined in accordance with the following:

$$B = 0.5 \cdot (\sigma xx - \sigma yy)/[\delta + \cos(2\theta)]$$

wherein B represents the fracture indicator value, and δ represents a constant.

3. The method of claim 1, wherein x-direction magnetic moments of the triaxial transmitter and the triaxial receiver are coplanar, and wherein y-direction magnetic moments of the triaxial transmitter and the triaxial receiver are coplanar.

4. The method of claim 1, wherein the triaxial transmitter is actuated using continuous wave alternating current at at least one frequency.

5. The method of claim 1, wherein the fracture orientation value is determined from the two measured responses without inversion to obtain at least one of horizontal resistivity, vertical resistivity, dip, or dip azimuth of the formation.

6. A method for determining existence of a fracture in a formation surrounding a wellbore drilled through subsurface rock formations, the method comprising:

(a) moving an electromagnetic logging tool along a depth axis of the wellbore, the electromagnetic logging tool including a triaxial transmitter and a triaxial receiver longitudinally spaced apart from one another;

(b) causing the electromagnetic logging tool to obtain triaxial conductivity tensor logs as a function of depth in the wellbore while moving in (a);

(c) inverting the triaxial conductivity tensor logs to obtain horizontal resistivity, vertical resistivity, and formation dip angle logs;

(d) processing the conductivity tensor logs to compute fracture orientation, fracture indication value, and axial resistivity logs of the subsurface rock formations;

(e) processing the fracture orientation and fracture indication value logs with a depth filter to compute an average fracture indication value;
(f) processing the axial resistivity log to compute a spread in axial resistivity values between various axial resolution values; and
(g) flagging a fracture zone at depth ranges in which the formation dip angle obtained in (c) is greater than 75 degrees, the average fracture indication value computed in (e) is greater than a first threshold, and the spread in axial resistivity values computed in (f) is greater than a second threshold.

7. The method of claim 6, wherein the fracture orientation is computed in (c) using the following equation:

$$\theta = 0.5 \cdot \tan^{-1}[(\sigma xx + \sigma yy - 2\sigma xx_{45})/(\sigma xx - \sigma yy)]$$

wherein $\theta$ represents the fracture orientation, $\sigma xx$ represents a first member of the conductivity tensor, $\sigma yy$ represents a second member of the conductivity tensor, and $\sigma xx_{45}$ represents an apparent conductivity of the first member rotated by 45 degrees about an axial direction of the logging tool.

8. The method of claim 6, wherein the fracture indication value is computed in (c) using the following equation:

$$B = 0.5 \cdot (\sigma xx - \sigma yy)/[\delta + \cos(2\theta)]$$

wherein B represents the fracture indicator value, $\delta$ represents a constant that prevents the denominator from being zero, $\theta$ represents the fracture orientation, $\sigma xx$ represents a first member of the conductivity tensor, $\sigma yy$ represents a second member of the conductivity tensor.

* * * * *